US012698818B2

(12) United States Patent
    Marking

(10) Patent No.: US 12,698,818 B2
(45) Date of Patent: *Aug. 4, 2026

(54) SUSPENSION DAMPER WITH REMOTELY-OPERABLE VALVE

(71) Applicant: Fox Factory, Inc., Watsonville, CA (US)

(72) Inventor: John Marking, El Cajon, CA (US)

(73) Assignee: Fox Factory, Inc., Duluth, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/965,761

(22) Filed: Dec. 10, 2015

(65) Prior Publication Data

US 2016/0153516 A1 Jun. 2, 2016

Related U.S. Application Data

(63) Continuation of application No. 13/189,216, filed on Jul. 22, 2011, now Pat. No. 9,239,090, which is a (Continued)

(51) Int. Cl.
    *F16F 9/46* (2006.01)
    *B60G 13/08* (2006.01)
    *B60G 17/08* (2006.01)
    *F16F 9/06* (2006.01)
    *F16F 9/348* (2006.01)
    (Continued)

(52) U.S. Cl.
    CPC .............. *F16F 9/466* (2013.01); *B60G 13/08* (2013.01); *B60G 17/08* (2013.01); *F16F 9/065* (2013.01); *F16F 9/348* (2013.01); *F16F 9/516*

(2013.01); *B60G 2202/24* (2013.01); *B60G 2500/11* (2013.01); *B60G 2600/20* (2013.01); *F16F 7/09* (2013.01); *F16F 9/06* (2013.01); *F16F 2228/066* (2013.01)

(58) Field of Classification Search
    CPC .. F16F 9/065; F16F 9/348; F16F 9/466; F16F 7/09; F16F 9/06; F16F 9/516; F16F 2228/066; B60G 17/08; B60G 13/08; B60G 2600/20; B60G 2202/24; B60G 2500/11
    See application file for complete search history.

(56) References Cited

U.S. PATENT DOCUMENTS

| | | | |
|---|---|---|---|
| 435,995 A | 9/1890 | Dunlop | |
| 1,948,600 A | 2/1934 | Templeton | |
| | (Continued) | | |

FOREIGN PATENT DOCUMENTS

| | | | |
|---|---|---|---|
| CN | 101468587 A | 7/2009 | |
| DE | 1555311 A1 | 8/1970 | |
| | (Continued) | | |

OTHER PUBLICATIONS

English language abstract for EP 0207409 (no date).

(Continued)

*Primary Examiner* — Melody M Burch

(57) ABSTRACT

A vehicle damper comprising a cylinder and a piston; a working fluid within the cylinder; a reservoir in fluid communication with the working fluid to receive working fluid from the cylinder in a compression stroke; and a remotely-operable valve, the valve operable to permit and restrict flow of the working fluid between the cylinder and the reservoir.

13 Claims, 8 Drawing Sheets

Related U.S. Application Data continuation-in-part of application No. 13/175,244, filed on Jul. 1, 2011, now Pat. No. 8,627,932, and a continuation-in-part of application No. 13/010,697, filed on Jan. 20, 2011, now Pat. No. 8,857,580, which is a continuation-in-part of application No. 12/684,072, filed on Jan. 7, 2010, now abandoned, said application No. 13/189,216 is a continuation-in-part of application No. 12/684,072, filed on Jan. 7, 2010, now abandoned.

(60) Provisional application No. 61/381,906, filed on Sep. 10, 2010, provisional application No. 61/366,871, filed on Jul. 22, 2010, provisional application No. 61/361,127, filed on Jul. 2, 2010, provisional application No. 61/296,826, filed on Jan. 20, 2010, provisional application No. 61/143,152, filed on Jan. 7, 2009.

(51) Int. Cl.
  *F16F 9/516* (2006.01)
  *F16F 7/09* (2006.01)

(56) References Cited

U.S. PATENT DOCUMENTS

| | | | |
|---|---|---|---|
| 1,970,239 A | 8/1934 | Klaas | |
| 2,098,119 A | 11/1937 | White | |
| 2,122,407 A | 7/1938 | Chisholm | |
| 2,186,266 A | 1/1940 | Henry | |
| 2,259,437 A | 10/1941 | Dean | |
| 2,379,750 A | 7/1945 | Rossman | |
| 2,540,525 A | 2/1951 | Howarth et al. | |
| 2,588,520 A | 3/1952 | Halgren et al. | |
| 2,697,600 A | 12/1954 | Gregoire | |
| 2,729,308 A | 1/1956 | Koski et al. | |
| 2,778,378 A | 1/1957 | Presnell | |
| 2,784,962 A | 3/1957 | Sherburne | |
| 2,838,140 A | 6/1958 | Rasmusson et al. | |
| 2,846,028 A | 8/1958 | Gunther | |
| 2,879,971 A | 3/1959 | Demay | |
| 3,087,583 A | 4/1963 | Bruns | |
| 3,206,153 A | 9/1965 | Burke | |
| 3,284,076 A | 11/1966 | Gibson | |
| 3,405,625 A | 10/1968 | Carlson et al. | |
| 3,419,849 A | 12/1968 | Anderson et al. | |
| 3,528,700 A | 9/1970 | Janu et al. | |
| 3,537,722 A * | 11/1970 | Moulton | B60G 3/20 |
| | | | 280/124.136 |
| 3,559,027 A | 1/1971 | Arsem | |
| 3,603,575 A | 9/1971 | Arlasky et al. | |
| 3,618,972 A | 11/1971 | Buhl | |
| 3,621,950 A | 11/1971 | Lutz | |
| 3,701,544 A | 10/1972 | Stankovich | |
| 3,830,482 A | 8/1974 | Norris | |
| 3,842,753 A | 10/1974 | Ross et al. | |
| 3,861,487 A | 1/1975 | Gill | |
| 3,941,402 A | 3/1976 | Yankowski et al. | |
| 3,981,204 A | 9/1976 | Starbard et al. | |
| 3,981,479 A | 9/1976 | Foster et al. | |
| 3,986,118 A | 10/1976 | Madigan et al. | |
| 3,995,883 A | 12/1976 | Glaze | |
| 4,032,829 A | 6/1977 | Schenavar et al. | |
| 4,036,335 A | 7/1977 | Thompson et al. | |
| 4,103,881 A | 8/1978 | Simich | |
| 4,106,522 A | 8/1978 | Manesse | |
| 4,114,735 A | 9/1978 | Kato | |
| 4,121,610 A * | 10/1978 | Harms | F15B 13/02 |
| | | | 137/115.03 |
| 4,131,657 A | 12/1978 | Ball et al. | |
| 4,153,237 A | 5/1979 | Supalla | |
| 4,159,106 A * | 6/1979 | Nyman | B60G 17/027 |
| | | | 137/493 |
| 4,236,613 A | 12/1980 | Van Der Lely | |
| 4,287,812 A | 9/1981 | Izumi | |
| 4,305,566 A | 12/1981 | Grawunde | |
| 4,333,668 A * | 6/1982 | Hendrickson | B60G 17/018 |
| | | | 188/266.2 |
| 4,348,016 A | 9/1982 | Milly | |
| 4,351,515 A | 9/1982 | Yoshida | |
| 4,366,969 A | 1/1983 | Benya et al. | |
| 4,387,781 A | 6/1983 | Ezell et al. | |
| 4,474,363 A | 10/1984 | Numazawa et al. | |
| 4,500,827 A | 2/1985 | Merritt et al. | |
| 4,546,959 A | 10/1985 | Tanno | |
| 4,570,851 A | 2/1986 | Cirillo et al. | |
| 4,572,317 A | 2/1986 | Isono et al. | |
| 4,616,810 A | 10/1986 | Richardson et al. | |
| 4,634,142 A | 1/1987 | Woods et al. | |
| 4,659,104 A | 4/1987 | Tanaka et al. | |
| 4,673,194 A | 6/1987 | Sugasawa | |
| 4,696,489 A | 9/1987 | Fujishiro et al. | |
| 4,709,779 A | 12/1987 | Takehara | |
| 4,723,753 A | 2/1988 | Torimoto et al. | |
| 4,729,459 A * | 3/1988 | Inagaki | B60G 17/01941 |
| | | | 188/1.11 E |
| 4,732,244 A | 3/1988 | Verkuylen | |
| 4,743,000 A | 5/1988 | Karnopp | |
| 4,744,444 A | 5/1988 | Gillingham | |
| 4,765,648 A | 8/1988 | Mander et al. | |
| 4,773,671 A | 9/1988 | Inagaki | |
| 4,786,034 A | 11/1988 | Heess et al. | |
| 4,802,561 A | 2/1989 | Knecht et al. | |
| 4,806,082 A | 2/1989 | Schenk | |
| 4,815,575 A | 3/1989 | Murty et al. | |
| 4,821,852 A | 4/1989 | Yokoya | |
| 4,830,395 A | 5/1989 | Foley | |
| 4,836,578 A | 6/1989 | Soltis | |
| 4,838,306 A | 6/1989 | Horn et al. | |
| 4,838,394 A | 6/1989 | Lemme et al. | |
| 4,858,733 A | 8/1989 | Noguchi et al. | |
| 4,936,423 A | 6/1990 | Karnopp | |
| 4,958,706 A | 9/1990 | Richardson et al. | |
| 4,972,928 A | 11/1990 | Sirven | |
| 4,975,849 A | 12/1990 | Ema et al. | |
| 4,984,819 A | 1/1991 | Kakizaki et al. | |
| 4,986,393 A | 1/1991 | Preukschat et al. | |
| 5,027,303 A | 6/1991 | Witte | |
| 5,036,934 A | 8/1991 | Nishina et al. | |
| 5,040,381 A | 8/1991 | Hazen | |
| 5,044,614 A | 9/1991 | Rau | |
| 5,060,910 A | 10/1991 | Iwata et al. | |
| 5,060,959 A | 10/1991 | Davis et al. | |
| 5,076,404 A * | 12/1991 | Gustafsson | F16F 9/0209 |
| | | | 188/314 |
| 5,080,392 A | 1/1992 | Bazergui | |
| 5,105,918 A | 4/1992 | Hagiwara et al. | |
| 5,113,980 A | 5/1992 | Furrer et al. | |
| 5,152,547 A | 10/1992 | Davis | |
| 5,163,742 A * | 11/1992 | Topfer | B60T 8/1708 |
| | | | 303/155 |
| 5,186,481 A | 2/1993 | Turner | |
| 5,207,300 A | 5/1993 | Engel et al. | |
| 5,231,583 A | 7/1993 | Lizell | |
| 5,236,169 A | 8/1993 | Johnsen et al. | |
| 5,246,247 A | 9/1993 | Runkel | |
| 5,248,014 A | 9/1993 | Ashiba | |
| 5,263,559 A * | 11/1993 | Mettner | B60G 17/08 |
| | | | 188/266.5 |
| 5,265,902 A | 11/1993 | Lewis | |
| 5,275,086 A | 1/1994 | Stallings, Jr. | |
| 5,284,330 A | 2/1994 | Carlson et al. | |
| 5,295,074 A | 3/1994 | Williams | |
| 5,295,563 A | 3/1994 | Bennett | |
| 5,297,045 A | 3/1994 | Williams et al. | |
| 5,301,776 A | 4/1994 | Beck | |
| 5,311,709 A | 5/1994 | Kobori et al. | |
| 5,318,066 A | 6/1994 | Burgorf et al. | |
| 5,328,004 A | 7/1994 | Fannin et al. | |
| 5,346,242 A | 9/1994 | Karnopp | |
| 5,347,186 A | 9/1994 | Konotchick et al. | |
| 5,348,112 A | 9/1994 | Vaillancourt | |

(56)                References Cited

U.S. PATENT DOCUMENTS

| | | | |
|---|---|---|---|
| 5,372,224 A | 12/1994 | Samonil et al. |
| 5,381,952 A | 1/1995 | Duprez |
| 5,390,949 A | 2/1995 | Naganathan et al. |
| 5,392,885 A | 2/1995 | Patzenhauer et al. |
| 5,392,886 A | 2/1995 | Drummond |
| 5,396,973 A | 3/1995 | Schwemmer et al. |
| 5,398,787 A | 3/1995 | Woessner et al. |
| 5,413,196 A | 5/1995 | Forster |
| 5,467,280 A | 11/1995 | Kimura |
| 5,475,593 A | 12/1995 | Townend |
| 5,480,011 A | 1/1996 | Nagai et al. |
| 5,485,417 A | 1/1996 | Wolf et al. |
| 5,551,674 A | 9/1996 | Johnsen |
| 5,553,836 A | 9/1996 | Ericson |
| 5,578,877 A | 11/1996 | Tiemann |
| 5,586,637 A | 12/1996 | Aidlin et al. |
| 5,601,164 A | 2/1997 | Ohsaki et al. |
| 5,611,413 A | 3/1997 | Feigel |
| 5,651,433 A | 7/1997 | Wirth et al. |
| 5,687,575 A | 11/1997 | Keville et al. |
| 5,722,645 A | 3/1998 | Reitter |
| 5,735,372 A | 4/1998 | Hamilton et al. |
| 5,803,443 A | 9/1998 | Chang |
| 5,806,159 A | 9/1998 | Inoue et al. |
| 5,810,384 A | 9/1998 | Iwasaki et al. |
| 5,813,456 A | 9/1998 | Milner et al. |
| 5,818,132 A | 10/1998 | Konotchick et al. |
| 5,826,935 A | 10/1998 | Defreitas et al. |
| 5,850,896 A | 12/1998 | Tanaka |
| 5,872,418 A | 2/1999 | Wischnewskiy |
| 5,947,238 A | 9/1999 | Jolly et al. |
| 5,952,823 A | 9/1999 | Sprecher et al. |
| 5,954,318 A | 9/1999 | Kluhsman |
| 5,956,951 A | 9/1999 | O'Callaghan |
| 5,957,252 A | 9/1999 | Berthold |
| 5,971,116 A * | 10/1999 | Franklin ............ B60G 17/0152 |
| | | 188/266.2 |
| 5,987,368 A | 11/1999 | Kamimae et al. |
| 5,996,745 A | 12/1999 | Jones et al. |
| 5,999,868 A | 12/1999 | Beno et al. |
| 6,000,702 A * | 12/1999 | Streiter ................ B60G 17/016 |
| | | 280/5.507 |
| 6,073,536 A | 6/2000 | Campbell |
| 6,073,700 A | 6/2000 | Tsuji et al. |
| 6,073,708 A | 6/2000 | Brown et al. |
| 6,073,736 A | 6/2000 | Franklin |
| 6,079,526 A | 6/2000 | Nezu et al. |
| 6,092,816 A | 7/2000 | Sekine et al. |
| 6,131,709 A | 10/2000 | Jolly et al. |
| 6,135,434 A | 10/2000 | Marking |
| 6,141,969 A | 11/2000 | Launchbury et al. |
| 6,151,930 A | 11/2000 | Carlson |
| 6,157,103 A | 12/2000 | Ohta et al. |
| 6,179,098 B1 | 1/2001 | Hayakawa et al. |
| 6,182,687 B1 | 2/2001 | Förster et al. |
| 6,199,001 B1 | 3/2001 | Ohta et al. |
| 6,199,669 B1 | 3/2001 | Huang et al. |
| 6,215,217 B1 | 4/2001 | Kurosawa et al. |
| 6,217,049 B1 | 4/2001 | Becker |
| 6,244,398 B1 | 6/2001 | Girvin et al. |
| 6,279,702 B1 | 8/2001 | Koh |
| 6,290,034 B1 | 9/2001 | Ichimaru |
| 6,296,091 B1 | 10/2001 | Hamilton |
| 6,296,092 B1 * | 10/2001 | Marking ............... F16F 9/0209 |
| | | 188/315 |
| 6,311,962 B1 | 11/2001 | Marking |
| 6,321,888 B1 | 11/2001 | Reybrouck et al. |
| 6,322,468 B1 * | 11/2001 | Wing ........................ F16H 7/08 |
| | | 474/109 |
| 6,343,807 B1 | 2/2002 | Rathbun |
| 6,352,144 B1 | 3/2002 | Brooks et al. |
| 6,360,857 B1 | 3/2002 | Fox et al. |
| 6,371,267 B1 | 4/2002 | Kao et al. |
| 6,378,885 B1 | 4/2002 | Ellsworth et al. |
| 6,389,341 B1 | 5/2002 | Davis |
| 6,390,747 B1 | 5/2002 | Commins |
| 6,394,238 B1 | 5/2002 | Rogala |
| 6,401,883 B1 | 6/2002 | Nyce et al. |
| 6,418,360 B1 | 7/2002 | Spivey et al. |
| 6,434,460 B1 | 8/2002 | Uchino et al. |
| 6,446,771 B1 | 9/2002 | Sintorn et al. |
| 6,460,567 B1 | 10/2002 | Hansen et al. |
| 6,467,593 B1 | 10/2002 | Corradini et al. |
| 6,474,454 B2 | 11/2002 | Matsumoto et al. |
| 6,501,554 B1 | 12/2002 | Hackney et al. |
| 6,502,837 B1 | 1/2003 | Hamilton et al. |
| 6,510,929 B1 | 1/2003 | Gordaninejad et al. |
| 6,520,297 B1 | 2/2003 | Lumpkin et al. |
| 6,527,093 B2 | 3/2003 | Oliver et al. |
| 6,604,751 B2 | 8/2003 | Fox |
| 6,651,788 B1 | 11/2003 | Wohlfarth |
| 6,659,240 B2 | 12/2003 | Dernebo |
| 6,659,241 B2 | 12/2003 | Sendrea |
| 6,672,687 B2 | 1/2004 | Nishio |
| 6,722,678 B2 | 4/2004 | Mcandrews |
| 6,732,033 B2 | 5/2004 | Laplante et al. |
| 6,755,113 B2 | 6/2004 | Shih |
| 6,782,980 B2 | 8/2004 | Nakadate |
| 6,814,348 B1 | 11/2004 | Leben et al. |
| 6,817,454 B2 | 11/2004 | Nezu et al. |
| 6,840,257 B2 | 1/2005 | Dario et al. |
| 6,857,625 B2 | 2/2005 | Löser et al. |
| 6,863,291 B2 | 3/2005 | Miyoshi |
| 6,905,203 B2 | 6/2005 | Kremers et al. |
| 6,920,951 B2 | 7/2005 | Song et al. |
| 6,923,853 B2 | 8/2005 | Kremers et al. |
| 6,935,157 B2 | 8/2005 | Miller |
| 6,952,060 B2 | 10/2005 | Goldner et al. |
| 6,959,921 B2 | 11/2005 | Rose |
| 6,978,872 B2 | 12/2005 | Turner |
| 7,025,367 B2 | 4/2006 | Mckinnon et al. |
| 7,050,795 B2 | 5/2006 | Wiegand et al. |
| 7,076,351 B2 | 7/2006 | Hamilton et al. |
| 7,135,794 B2 | 11/2006 | Kühnel |
| 7,139,660 B2 | 11/2006 | Sarkar et al. |
| 7,147,207 B2 | 12/2006 | Jordan et al. |
| 7,163,222 B2 | 1/2007 | Becker et al. |
| 7,208,845 B2 | 4/2007 | Schaefer et al. |
| 7,234,574 B2 | 6/2007 | Matsunaga et al. |
| 7,234,575 B2 | 6/2007 | Anderfaas et al. |
| 7,243,763 B2 | 7/2007 | Carlson |
| 7,287,760 B1 | 10/2007 | Quick et al. |
| 7,293,764 B2 | 11/2007 | Fang |
| 7,302,961 B2 | 12/2007 | Martin et al. |
| 7,316,406 B2 | 1/2008 | Kimura et al. |
| 7,320,387 B2 | 1/2008 | Sendrea |
| 7,363,129 B1 | 4/2008 | Barnicle et al. |
| 7,374,028 B2 * | 5/2008 | Fox .......................... F16F 9/44 |
| | | 188/322.13 |
| 7,397,355 B2 | 7/2008 | Tracy |
| 7,413,062 B2 | 8/2008 | Vandewal |
| 7,413,063 B1 | 8/2008 | Davis |
| 7,422,092 B2 | 9/2008 | Hitchcock et al. |
| 7,441,638 B2 | 10/2008 | Hanawa |
| 7,469,910 B2 | 12/2008 | Münster et al. |
| 7,484,603 B2 | 2/2009 | Fox |
| 7,490,705 B2 | 2/2009 | Fox |
| 7,512,520 B2 | 3/2009 | Sack et al. |
| 7,523,617 B2 | 4/2009 | Colpitts et al. |
| 7,569,952 B1 | 8/2009 | Bono et al. |
| 7,581,743 B2 | 9/2009 | Graney et al. |
| 7,600,616 B2 | 10/2009 | Anderfaas et al. |
| 7,628,414 B2 | 12/2009 | Dobson et al. |
| 7,631,882 B2 | 12/2009 | Hirao et al. |
| 7,654,369 B2 | 2/2010 | Murray et al. |
| 7,673,936 B2 | 3/2010 | Hsu et al. |
| 7,684,911 B2 | 3/2010 | Seifert et al. |
| 7,694,785 B2 | 4/2010 | Nakadate |
| 7,694,987 B2 | 4/2010 | Mcandrews |
| 7,722,056 B2 | 5/2010 | Inoue et al. |
| 7,725,129 B2 | 5/2010 | Grunhold |
| 7,726,042 B2 | 6/2010 | Meschan |
| 7,730,906 B2 | 6/2010 | Kleinert et al. |
| 7,744,097 B2 | 6/2010 | Noguchi |

(56) References Cited

U.S. PATENT DOCUMENTS

| | | |
|---|---|---|
| 7,770,701 B1 | 8/2010 | Davis |
| 7,795,711 B2 | 9/2010 | Sauciuc et al. |
| 7,822,522 B2 | 10/2010 | Wereley et al. |
| 7,828,125 B2 | 11/2010 | Sekiya et al. |
| 7,828,126 B2 | 11/2010 | Lun |
| 7,837,213 B2 | 11/2010 | Colegrove et al. |
| 7,840,322 B2 | 11/2010 | Ross et al. |
| 7,857,325 B2 | 12/2010 | Copsey et al. |
| 7,909,348 B2 | 3/2011 | Klieber et al. |
| 7,931,132 B2 | 4/2011 | Braun |
| 7,946,163 B2 | 5/2011 | Gartner |
| 7,975,814 B2 | 7/2011 | Soederdahl |
| 8,016,349 B2 | 9/2011 | Mouri et al. |
| 8,056,392 B2 | 11/2011 | Ryan et al. |
| 8,087,676 B2 | 1/2012 | Mcintyre |
| 8,091,910 B2 | 1/2012 | Hara et al. |
| 8,104,591 B2 | 1/2012 | Barefoot et al. |
| 8,121,785 B2 | 2/2012 | Swisher et al. |
| 8,127,900 B2 | 3/2012 | Inoue |
| 8,136,877 B2 | 3/2012 | Walsh et al. |
| 8,151,952 B2 | 4/2012 | Lenz et al. |
| 8,191,964 B2 | 6/2012 | Hsu et al. |
| 8,210,106 B2 | 7/2012 | Tai et al. |
| 8,262,058 B2 | 9/2012 | Kot |
| 8,262,062 B2 | 9/2012 | Kamo et al. |
| 8,262,100 B2 | 9/2012 | Thomas |
| 8,265,825 B2 | 9/2012 | Kajino et al. |
| 8,286,982 B2 | 10/2012 | Plantet et al. |
| 8,291,889 B2 | 10/2012 | Shafer et al. |
| 8,292,274 B2 | 10/2012 | Adoline et al. |
| 8,307,965 B2 | 11/2012 | Föster et al. |
| 8,308,124 B2 | 11/2012 | Hsu |
| 8,317,261 B2 | 11/2012 | Walsh et al. |
| 8,321,177 B2 | 11/2012 | Sack et al. |
| 8,322,497 B2 | 12/2012 | Marjoram et al. |
| 8,336,683 B2 | 12/2012 | Mcandrews et al. |
| 8,364,389 B2 | 1/2013 | Dorogusker et al. |
| 8,393,446 B2 | 3/2013 | Haugen |
| 8,413,773 B2 | 4/2013 | Anderfaas et al. |
| 8,423,244 B2 | 4/2013 | Proemm et al. |
| 8,458,080 B2 | 6/2013 | Shirai |
| 8,495,947 B2 | 7/2013 | Hata |
| 8,550,551 B2 | 10/2013 | Shirai |
| 8,556,048 B2 | 10/2013 | Maeda et al. |
| 8,556,049 B2 | 10/2013 | Jee |
| 8,596,663 B2 | 12/2013 | Shirai et al. |
| 8,616,351 B2 | 12/2013 | Roessle et al. |
| 8,627,930 B2 | 1/2014 | Smith et al. |
| 8,641,073 B2 | 2/2014 | Lee et al. |
| 8,651,251 B2 | 2/2014 | Preukschat et al. |
| 8,655,548 B2 | 2/2014 | Ichida et al. |
| 8,684,367 B2 | 4/2014 | Haugen |
| 8,744,699 B2 | 6/2014 | Yamaguchi et al. |
| 8,752,682 B2 | 6/2014 | Park et al. |
| 8,770,357 B2 | 7/2014 | Sims et al. |
| 8,781,680 B2 | 7/2014 | Ichida et al. |
| 8,781,690 B2 | 7/2014 | Hara et al. |
| 8,812,212 B2 | 8/2014 | Tomlinson et al. |
| 8,814,109 B2 | 8/2014 | Calendrille et al. |
| 8,833,786 B2 | 9/2014 | Camp et al. |
| 8,838,335 B2 | 9/2014 | Bass et al. |
| 8,888,115 B2 | 11/2014 | Chubbuck et al. |
| 8,935,036 B1 | 1/2015 | Christensen et al. |
| 8,950,771 B2 | 2/2015 | Felsl et al. |
| 8,955,653 B2 | 2/2015 | Marking |
| 8,967,343 B2 | 3/2015 | Battlogg et al. |
| 8,985,594 B2 | 3/2015 | Yabumoto |
| 8,991,571 B2 | 3/2015 | Murakami |
| 9,038,791 B2 | 5/2015 | Marking |
| 9,047,778 B1 | 6/2015 | Cazanas et al. |
| 9,073,592 B2 | 7/2015 | Hsu |
| 9,126,647 B2 | 9/2015 | Kuo |
| 9,140,325 B2 | 9/2015 | Cox et al. |
| 9,157,523 B2 | 10/2015 | Miki et al. |
| 9,194,456 B2 | 11/2015 | Laird et al. |
| 9,199,690 B2 | 12/2015 | Watarai |
| 9,217,482 B2 | 12/2015 | Schürmann et al. |
| 9,239,090 B2 | 1/2016 | Marking |
| 9,278,598 B2 | 3/2016 | Galasso et al. |
| 9,353,818 B2 | 5/2016 | Marking |
| 9,366,307 B2 | 6/2016 | Marking |
| 9,415,659 B2 | 8/2016 | Kikuchi et al. |
| 9,422,018 B2 | 8/2016 | Pelot et al. |
| 9,452,654 B2 | 9/2016 | Ericksen |
| 9,550,405 B2 | 1/2017 | Marking et al. |
| 9,556,925 B2 | 1/2017 | Marking |
| 9,558,419 B1 | 1/2017 | Wilbert et al. |
| 9,563,814 B1 | 2/2017 | Wilbert et al. |
| 9,573,600 B2 | 2/2017 | Gunaratne |
| 9,589,201 B1 | 3/2017 | Wilbert et al. |
| 9,616,728 B2 | 4/2017 | Marking |
| 9,663,181 B2 | 5/2017 | Ericksen et al. |
| 9,682,604 B2 | 6/2017 | Cox et al. |
| 9,765,842 B2 | 9/2017 | Noguchi |
| 9,810,282 B2 | 11/2017 | Roessle et al. |
| 9,975,598 B2 | 5/2018 | Bender et al. |
| 10,012,282 B2 | 7/2018 | Kimura et al. |
| 10,036,443 B2 | 7/2018 | Galasso et al. |
| 10,040,329 B2 | 8/2018 | Ericksen et al. |
| 10,047,817 B2 | 8/2018 | Ericksen et al. |
| 10,072,724 B2 | 9/2018 | Haugen et al. |
| 10,086,670 B2 | 10/2018 | Galasso et al. |
| 10,089,868 B1 | 10/2018 | Hayward |
| 10,094,443 B2 | 10/2018 | Marking |
| 10,160,511 B2 | 12/2018 | Ericksen et al. |
| 10,330,171 B2 | 6/2019 | Cox et al. |
| 10,336,148 B2 | 7/2019 | Ericksen et al. |
| 10,336,149 B2 | 7/2019 | Ericksen et al. |
| 10,406,883 B2 | 9/2019 | Marking |
| 10,415,662 B2 | 9/2019 | Marking |
| 10,443,671 B2 | 10/2019 | Marking |
| 10,473,179 B2 | 11/2019 | Ripa |
| 10,550,909 B2 | 2/2020 | Haugen |
| 10,670,106 B2 | 6/2020 | Ericksen et al. |
| 10,697,514 B2 | 6/2020 | Marking |
| 10,718,397 B2 | 7/2020 | Marking |
| 10,723,409 B2 | 7/2020 | Ericksen et al. |
| 10,737,546 B2 | 8/2020 | Tong |
| 10,759,247 B2 | 9/2020 | Galasso et al. |
| 10,967,878 B2 | 4/2021 | Cooke et al. |
| 11,162,555 B2 | 11/2021 | Haugen |
| 11,279,198 B2 | 3/2022 | Marking |
| 11,299,233 B2 | 4/2022 | Ericksen et al. |
| 11,472,252 B2 | 10/2022 | Tong |
| 11,499,601 B2 | 11/2022 | Marking |
| 11,549,565 B2 | 1/2023 | Ericksen et al. |
| 11,708,878 B2 | 7/2023 | Marking |
| 11,866,120 B2 | 1/2024 | Ericksen et al. |
| 11,920,655 B2 | 3/2024 | Galasso et al. |
| 11,958,328 B2 | 4/2024 | Galasso et al. |
| 12,539,729 B2 | 2/2026 | Galasso et al. |
| 2001/0017334 A1* | 8/2001 | Vincent .................. F16F 9/20 |
| | | 244/17.27 |
| 2001/0042663 A1 | 11/2001 | Marking et al. |
| 2002/0000352 A1 | 1/2002 | Matsumoto et al. |
| 2002/0032508 A1 | 3/2002 | Uchino et al. |
| 2002/0050518 A1 | 5/2002 | Roustaei |
| 2002/0063469 A1* | 5/2002 | Nishio .................. B60T 7/12 |
| | | 303/4 |
| 2002/0089107 A1 | 7/2002 | Koh |
| 2002/0095979 A1 | 7/2002 | Shirato et al. |
| 2002/0130000 A1 | 9/2002 | Lisenker et al. |
| 2002/0130003 A1 | 9/2002 | Lisenker et al. |
| 2002/0185581 A1 | 12/2002 | Trask et al. |
| 2003/0001346 A1 | 1/2003 | Hamilton et al. |
| 2003/0001358 A1 | 1/2003 | Becker et al. |
| 2003/0034697 A1 | 2/2003 | Goldner et al. |
| 2003/0051954 A1 | 3/2003 | Sendrea |
| 2003/0065430 A1 | 4/2003 | Lu et al. |
| 2003/0075403 A1 | 4/2003 | Dernebo |
| 2003/0103651 A1 | 6/2003 | Novak |
| 2003/0191567 A1 | 10/2003 | Gentilcore |
| 2003/0216845 A1 | 11/2003 | Williston |
| 2004/0017455 A1 | 1/2004 | Kremers et al. |

(56)                References Cited

U.S. PATENT DOCUMENTS

| | | |
|---|---|---|
| 2004/0021754 A1 | 2/2004 | Kremers et al. |
| 2004/0075350 A1 | 4/2004 | Kuhnel |
| 2004/0172178 A1 | 9/2004 | Takeda et al. |
| 2004/0208687 A1 | 10/2004 | Sicz et al. |
| 2004/0220712 A1 | 11/2004 | Takeda et al. |
| 2004/0256778 A1 | 12/2004 | Verriet |
| 2005/0056507 A1 | 3/2005 | De Molina et al. |
| 2005/0104320 A1 | 5/2005 | Wesling et al. |
| 2005/0121269 A1 | 6/2005 | Namuduri |
| 2005/0132587 A1 | 6/2005 | Larson et al. |
| 2005/0173849 A1* | 8/2005 | Vandewal .......... B60G 17/0152 |
| | | 267/64.11 |
| 2005/0195094 A1 | 9/2005 | White |
| 2005/0199455 A1 | 9/2005 | Browne et al. |
| 2005/0212248 A1 | 9/2005 | Karthaeuser et al. |
| 2006/0064223 A1 | 3/2006 | Voss |
| 2006/0066074 A1 | 3/2006 | Turner et al. |
| 2006/0096817 A1 | 5/2006 | Norgaard et al. |
| 2006/0120080 A1 | 6/2006 | Sipinski et al. |
| 2006/0137934 A1* | 6/2006 | Kurth ...................... A61F 11/08 |
| | | 181/135 |
| 2006/0144311 A1 | 7/2006 | Heyring et al. |
| 2006/0163551 A1* | 7/2006 | Coenen ..................... B60S 9/12 |
| | | 254/423 |
| 2006/0163787 A1 | 7/2006 | Munster et al. |
| 2006/0175792 A1 | 8/2006 | Sicz et al. |
| 2006/0181034 A1 | 8/2006 | Wilde et al. |
| 2006/0213082 A1 | 9/2006 | Meschan |
| 2006/0219503 A1* | 10/2006 | Kim ...................... B60G 15/12 |
| | | 188/282.2 |
| 2006/0225976 A1 | 10/2006 | Nakadate |
| 2006/0225979 A1* | 10/2006 | Quinn ..................... F16F 9/512 |
| | | 188/322.21 |
| 2006/0231359 A1 | 10/2006 | Matsunaga et al. |
| 2006/0254365 A1 | 11/2006 | Hamel |
| 2006/0265144 A1 | 11/2006 | Frolik |
| 2007/0007743 A1 | 1/2007 | Becker et al. |
| 2007/0021885 A1 | 1/2007 | Soehren |
| 2007/0021886 A1 | 1/2007 | Miyajima |
| 2007/0034464 A1 | 2/2007 | Barefoot |
| 2007/0088475 A1 | 4/2007 | Nordgren et al. |
| 2007/0090518 A1 | 4/2007 | Sauciuc et al. |
| 2007/0096426 A1 | 5/2007 | McAndrews |
| 2007/0119669 A1 | 5/2007 | Anderfaas et al. |
| 2007/0170688 A1 | 7/2007 | Watson |
| 2007/0260372 A1 | 11/2007 | Langer |
| 2008/0018065 A1 | 1/2008 | Hirao et al. |
| 2008/0029730 A1 | 2/2008 | Kamo et al. |
| 2008/0041677 A1 | 2/2008 | Namuduri |
| 2008/0067019 A1 | 3/2008 | Jensen et al. |
| 2008/0099968 A1 | 5/2008 | Schroeder |
| 2008/0114239 A1 | 5/2008 | Randall et al. |
| 2008/0116622 A1 | 5/2008 | Fox |
| 2008/0119330 A1 | 5/2008 | Chiang et al. |
| 2008/0162009 A1 | 7/2008 | Miki et al. |
| 2008/0185244 A1 | 8/2008 | Maeda et al. |
| 2008/0203631 A1 | 8/2008 | Gartner et al. |
| 2008/0250844 A1 | 10/2008 | Gartner |
| 2008/0290618 A1 | 11/2008 | Yanaka et al. |
| 2008/0303320 A1 | 12/2008 | Schranz et al. |
| 2008/0314706 A1 | 12/2008 | Lun et al. |
| 2009/0000885 A1 | 1/2009 | Mcandrews |
| 2009/0071772 A1 | 3/2009 | Cho et al. |
| 2009/0071773 A1 | 3/2009 | Lun |
| 2009/0121398 A1 | 5/2009 | Inoue |
| 2009/0138157 A1 | 5/2009 | Hagglund et al. |
| 2009/0140501 A1 | 6/2009 | Taylor et al. |
| 2009/0171532 A1 | 7/2009 | Ryan et al. |
| 2009/0192673 A1 | 7/2009 | Song et al. |
| 2009/0200126 A1 | 8/2009 | Kondo et al. |
| 2009/0200127 A1 | 8/2009 | Janes |
| 2009/0236807 A1 | 9/2009 | Wootten et al. |
| 2009/0261542 A1 | 10/2009 | Mcintyre |
| 2009/0277734 A1 | 11/2009 | Cox et al. |
| 2009/0288924 A1 | 11/2009 | Murray et al. |
| 2009/0294231 A1 | 12/2009 | Carlson et al. |
| 2009/0314592 A1 | 12/2009 | Nygren |
| 2009/0324327 A1 | 12/2009 | Mcandrews et al. |
| 2010/0025946 A1 | 2/2010 | Inoue et al. |
| 2010/0032254 A1 | 2/2010 | Anderfaas et al. |
| 2010/0044975 A1 | 2/2010 | Yablon et al. |
| 2010/0066051 A1 | 3/2010 | Haugen |
| 2010/0109277 A1 | 5/2010 | Furrer |
| 2010/0152969 A1 | 6/2010 | Li et al. |
| 2010/0207351 A1 | 8/2010 | Klieber et al. |
| 2010/0222939 A1 | 9/2010 | Namburu et al. |
| 2010/0244340 A1 | 9/2010 | Wootten et al. |
| 2010/0252972 A1 | 10/2010 | Cox et al. |
| 2010/0276238 A1 | 11/2010 | Crasset |
| 2010/0276906 A1 | 11/2010 | Galasso et al. |
| 2010/0308628 A1 | 12/2010 | Hsu et al. |
| 2010/0314917 A1 | 12/2010 | Hsieh et al. |
| 2010/0324781 A1 | 12/2010 | Gagliano |
| 2010/0327542 A1 | 12/2010 | Hara et al. |
| 2010/0332079 A1 | 12/2010 | Wang et al. |
| 2011/0022266 A1 | 1/2011 | Ippolito et al. |
| 2011/0035105 A1 | 2/2011 | Jolly |
| 2011/0067965 A1 | 3/2011 | Mcandrews |
| 2011/0086686 A1 | 4/2011 | Avent et al. |
| 2011/0095507 A1 | 4/2011 | Plantet et al. |
| 2011/0097139 A1 | 4/2011 | Hsu et al. |
| 2011/0109060 A1 | 5/2011 | Earle et al. |
| 2011/0127706 A1 | 6/2011 | Sims et al. |
| 2011/0202236 A1 | 8/2011 | Galasso et al. |
| 2011/0204201 A1 | 8/2011 | Kodama et al. |
| 2011/0257848 A1 | 10/2011 | Shirai |
| 2011/0315494 A1 | 12/2011 | Marking |
| 2012/0006949 A1 | 1/2012 | Laird et al. |
| 2012/0074660 A1 | 3/2012 | Thomas |
| 2012/0080279 A1 | 4/2012 | Galasso et al. |
| 2012/0136537 A1 | 5/2012 | Galasso et al. |
| 2012/0181126 A1 | 7/2012 | De Kock |
| 2012/0221228 A1 | 8/2012 | Noumura et al. |
| 2012/0228906 A1 | 9/2012 | Mcandrews et al. |
| 2012/0253600 A1 | 10/2012 | Ichida et al. |
| 2012/0274043 A1 | 11/2012 | Lee et al. |
| 2012/0312648 A1 | 12/2012 | Yu et al. |
| 2013/0032737 A1 | 2/2013 | Neilson et al. |
| 2013/0037361 A1 | 2/2013 | Park et al. |
| 2013/0081273 A1 | 4/2013 | Mcandrews et al. |
| 2013/0090195 A1 | 4/2013 | Yamaguchi et al. |
| 2013/0119634 A1 | 5/2013 | Camp et al. |
| 2013/0144489 A1 | 6/2013 | Galasso et al. |
| 2013/0168195 A1 | 7/2013 | Park et al. |
| 2013/0220110 A1 | 8/2013 | Zhan et al. |
| 2013/0228404 A1 | 9/2013 | Marking |
| 2013/0333993 A1 | 12/2013 | Yu |
| 2014/0000998 A1 | 1/2014 | Bismans et al. |
| 2014/0048365 A1 | 2/2014 | Kim |
| 2014/0061419 A1 | 3/2014 | Wehage et al. |
| 2014/0081522 A1 | 3/2014 | Fry |
| 2014/0124313 A1 | 5/2014 | Ericksen et al. |
| 2014/0316652 A1 | 10/2014 | Ericksen et al. |
| 2015/0073656 A1 | 3/2015 | Takamoto et al. |
| 2015/0090547 A1 | 4/2015 | Haugen |
| 2015/0141056 A1 | 5/2015 | Fefilatyev et al. |
| 2015/0166024 A1 | 6/2015 | Biller |
| 2015/0175236 A1 | 6/2015 | Walthert et al. |
| 2015/0179062 A1 | 6/2015 | Ralston et al. |
| 2015/0191069 A1 | 7/2015 | Zuleger et al. |
| 2015/0197308 A1 | 7/2015 | Butora et al. |
| 2015/0217829 A1 | 8/2015 | Ericksen et al. |
| 2015/0233442 A1 | 8/2015 | Noguchi |
| 2015/0276000 A1 | 10/2015 | Kimura et al. |
| 2016/0003320 A1 | 1/2016 | Kamakura et al. |
| 2016/0025178 A1 | 1/2016 | Kamakura et al. |
| 2016/0031506 A1 | 2/2016 | Lloyd et al. |
| 2016/0076617 A1 | 3/2016 | Marking |
| 2016/0153515 A1 | 6/2016 | Ebersbach et al. |
| 2016/0185178 A1 | 6/2016 | Galasso et al. |
| 2016/0200163 A1 | 7/2016 | Tsukahara |
| 2016/0200164 A1 | 7/2016 | Tabata et al. |
| 2016/0265615 A1 | 9/2016 | Marking |

(56) References Cited

U.S. PATENT DOCUMENTS

| | | | |
|---|---|---|---|
| 2016/0290431 | A1 | 10/2016 | Marking |
| 2016/0355226 | A1 | 12/2016 | Pelot et al. |
| 2016/0364989 | A1 | 12/2016 | Speasl et al. |
| 2017/0008363 | A1 | 1/2017 | Ericksen et al. |
| 2017/0136843 | A1 | 5/2017 | Marking |
| 2017/0184174 | A1 | 6/2017 | Marking |
| 2017/0217413 | A1 | 8/2017 | Kutzner et al. |
| 2017/0227083 | A1 | 8/2017 | Janes |
| 2017/0259876 | A1 | 9/2017 | Ericksen et al. |
| 2017/0268595 | A1 | 9/2017 | Inagaki et al. |
| 2017/0291466 | A1 | 10/2017 | Tong |
| 2017/0297545 | A1 | 10/2017 | Kim |
| 2018/0010666 | A1 | 1/2018 | Marking |
| 2018/0111622 | A1 | 4/2018 | Malone et al. |
| 2018/0150764 | A1 | 5/2018 | Stenneth |
| 2018/0156300 | A1 | 6/2018 | Sakai |
| 2018/0174446 | A1 | 6/2018 | Wang |
| 2018/0208011 | A1 | 7/2018 | Wigg et al. |
| 2018/0326808 | A1 | 11/2018 | Ericksen et al. |
| 2018/0328442 | A1 | 11/2018 | Galasso et al. |
| 2018/0328446 | A1 | 11/2018 | Ericksen et al. |
| 2018/0334007 | A1 | 11/2018 | Ericksen et al. |
| 2018/0334008 | A1 | 11/2018 | Ericksen et al. |
| 2018/0335102 | A1 | 11/2018 | Haugen |
| 2018/0339565 | A1 | 11/2018 | Ericksen et al. |
| 2018/0339566 | A1 | 11/2018 | Ericksen et al. |
| 2018/0339567 | A1 | 11/2018 | Ericksen et al. |
| 2018/0355946 | A1 | 12/2018 | Ericksen et al. |
| 2019/0030975 | A1 | 1/2019 | Galasso et al. |
| 2019/0032745 | A1 | 1/2019 | Marking |
| 2019/0154100 | A1 | 5/2019 | Coaplen et al. |
| 2019/0176557 | A1 | 6/2019 | Marking et al. |
| 2019/0184782 | A1 | 6/2019 | Shaw et al. |
| 2019/0203798 | A1 | 7/2019 | Cox et al. |
| 2019/0226545 | A1 | 7/2019 | Schmidt et al. |
| 2019/0232937 | A1 | 8/2019 | Georgin et al. |
| 2020/0114893 | A1 | 4/2020 | Kim |
| 2020/0292025 | A1 | 9/2020 | Ericksen et al. |
| 2020/0354013 | A1 | 11/2020 | Ericksen et al. |
| 2022/0242186 | A1 | 8/2022 | Tong |
| 2022/0252129 | A1 | 8/2022 | Haugen |
| 2023/0002002 | A1 | 1/2023 | Ericksen et al. |
| 2023/0019929 | A1 | 1/2023 | Cox et al. |

FOREIGN PATENT DOCUMENTS

| | | | |
|---|---|---|---|
| DE | 3613386 | A1 | 10/1986 |
| DE | 3536655 | A1 | 4/1987 |
| DE | 3711442 | A1 | 10/1988 |
| DE | 4022099 | C1 | 12/1991 |
| DE | 10326675 | A1 | 12/2004 |
| DE | 202010012738 | U1 | 12/2010 |
| EP | 207409 | A2 | 1/1987 |
| EP | 304801 | A2 | 3/1989 |
| EP | 0403803 | A1 | 12/1990 |
| EP | 0556925 | A2 | 8/1993 |
| EP | 0735280 | A2 | 10/1996 |
| EP | 1355209 | A1 | 10/2003 |
| EP | 1623856 | A2 | 2/2006 |
| EP | 1757473 | A2 | 2/2007 |
| EP | 1825220 | A2 | 8/2007 |
| EP | 2103512 | A2 | 9/2009 |
| EP | 2116739 | A2 | 11/2009 |
| EP | 2189191 | A2 | 5/2010 |
| EP | 2248691 | A1 | 11/2010 |
| EP | 2357098 | A2 | 8/2011 |
| EP | 2410203 | A2 | 1/2012 |
| EP | 2479095 | A2 | 7/2012 |
| EP | 2495472 | A2 | 9/2012 |
| EP | 2357098 | B1 | 10/2014 |
| EP | 3786049 | A1 | 3/2021 |
| EP | 3786049 | B1 | 5/2023 |
| EP | 4257469 | A3 | 8/2024 |
| FR | 1343760 | A | 11/1963 |
| FR | 2449236 | A1 | 9/1980 |
| FR | 2529002 | A | * 12/1983 |
| GB | 806307 | A | 12/1958 |
| GB | 1185074 | A | 3/1970 |
| GB | 2159234 | A | 11/1985 |
| GB | 2282864 | A | 4/1995 |
| GB | 2289111 | A | 11/1995 |
| JP | 57173632 | A | 10/1982 |
| JP | 57182506 | A | 11/1982 |
| JP | S58172142 | A | 10/1983 |
| JP | H0193637 | A | 4/1989 |
| JP | H03113139 | A | 5/1991 |
| JP | H05319054 | A | 12/1993 |
| JP | H084818 | A | 1/1996 |
| JP | H1073141 | A | 3/1998 |
| JP | 2005119549 | A | 5/2005 |
| JP | 2008094124 | A | 4/2008 |
| KR | 20070076226 | A | 7/2007 |
| KR | 20100041679 | A | 4/2010 |
| RU | 2469224 | C1 | 12/2012 |
| WO | 98/40231 | | 9/1998 |
| WO | 99/06231 | | 2/1999 |
| WO | 0027658 | A1 | 5/2000 |
| WO | 03102426 | A2 | 12/2003 |

OTHER PUBLICATIONS

European Search Report, European Patent Application No. 14189773.6, May 4, 2015, 4 Pages.

EP Search Report for European Application No. 15163428.4, Jul. 3, 2017, 7 Pages.

"European Patent Office Final Decision dated Mar. 21, 2013", European Patent Application No. 10161906.2.

"European Search Report and Written Opinion, European Patent Application No. 13165362.8", Sep. 24, 2014, 6 Pages.

Nilsson, "Opposition Letter Against EP-2357098", Oct. 13, 2017, 7 pages.

"European Search Report for European Application No. 10187320, 12 pages, Sep. 25, 2017 (Sep. 25, 2017)".

"European Search Report for European Application No. 12184150, 10 pages, Dec. 12, 2017 (Dec. 12, 2017)".

Shiozaki, et al., "SP-861-Vehicle Dynamics and Electronic Controlled Suspensions SAE Technical Paper Series No. 910661", International Congress and Exposition, Detroit, Mich., Feb. 25-Mar. 1, 1991.

Smith, ""The Bump Stop" in Engineer to win—Chapter 13: Springs and Shock Absorbers", MBI Publishing Company and Motorbooks, USA XP055430818, ISBN: 978-0-87938-186-8, Dec. 31, 1984, 207.

"European Search Report for European Application No. 11153607, 3 pages, Aug. 10, 2012 (Aug. 10, 2012))".

"European Search Report for European Application No. 11172553, 2 pages, Sep. 25, 2017 (Sep. 25, 2017)".

"European Search Report for European Application No. 11175126, 2 pages, Sep. 25, 2017 (Sep. 25, 2017)".

"European Search Report for European Application No. 13174817.0, 13 pages, Jan. 8, 2018 (Jan. 8, 2018))".

"European Search Report for European Application No. 17188022, 9 pages, Feb. 1, 2018 (Feb. 1, 2018))".

Statement of Grounds of Appeal, EP App. No. 11153607.4, May 28, 2018, 88 Pages.

Grounds of Appeal, EP App. No. 11153607.4, Jun. 1, 2018, 28 Pages.

Puhn, "How To Make Your Car Handle", HPBooks, 1981, 7 Pages.

"European Search Report for EP Application No. 18154672, 3 pages, Mailed Aug. 28, 2018 (Aug. 28, 2018))".

U.S. Appl. No. 61/175,422, filed May 4, 2009, Mario Galasso et al., 17 Pages.

U.S. Appl. No. 61/302,070, filed Feb. 5, 2010, Mario Galasso et al., 39 Pages.

"17 Years of Innovation and Still Evolving", https://www.powertap.com/post/blog-15-17-years-of-innovation-and-still-evolving, Nov. 28, 2018, 8 Pages.

"ANT Message Protocol and Usage", Dynastream Innovations, Inc., Jul. 2, 2007, 68 Pages.

(56) References Cited

OTHER PUBLICATIONS

"Basis For Claims Filed Jan. 15, 2023", European Patent Application No. 14189773.6, 2 Pages.
Thum, Notice of Opposition to a European Patent, EP App. No. 14189773.6, Dec. 13, 2018, 49 Pages.
Healey, "The Tyre as Part of the Suspension System", The Institution of Automobile Engineers, Nov. 1924, 26-128.
Kasprzak, "Understanding Your Dampers: A guide from Jim Kasprzak", http://www.kaztechnologies.com/downloads/kaz-tech-tips/ Accessed: Oct. 24, 2018, 25 pages.
Litchfield, "Pneumatic Tires", Transactions (Society of Automobile Engineers), vol. 8, Part II, 1913, 208-223.
Thum, "Oppostion Letter Against EP2357098", Oct. 16, 2018, 39.
Waechter, et al., "A Multibody Model for the Simulation of Bicycle Suspension Systems", Vehicle System Dynamics, vol. 37, No. 1, 2002, 3-28.
European Search Report for European Application No. 19157767, filed Oct. 16, 2019, 9 Pages.
Thum, "Oppostion Letter Against EP2357098", Dec. 17, 2019, 25 Pages.
European Search Report for European Application No. 19206334.5, 6 pages, May 12, 2020 (May 12, 2020).
European Search Report for European Application No. 19212356.0, 8 pages, May 7, 2020 (May 7, 2020).
Machine translation DE3613386; Oct. 1986.
Machine translation EP 0403803; Dec. 1990.
Machine translation KR20100041679; Apr. 2010.
European Search Report for European Application No. 20187747, filed Nov. 18, 2020, 11 Pages.
EP Search Report for European Application No. 21173940.4, Nov. 12, 2021, 9 Pages.
Haller, E, EPO machine translation of CN 101468587 (A) Device with a suspension system and method for setting a suspension system, published on Jul. 1, 2009.
Kensuke, Suspension Control Device, machine translation of JPH05319054 (A), Dec. 3, 1993 (Year: 1993).
European Extended Search Report for European Application No. 23166846.8, 24 Pages, Mailed Jul. 25, 2024.
Weickert, Response to the Communication of the Board of Appeal, Opposition Against European Patent, EP App. No. 14189773.6, 13 Pages, Dated Aug. 29, 2024.
JP2008094124A—english translation by Clarivate (Year: 2008).
European Examination Report for European Application No. 21173940.4, 5 Pages, Mailed Jul. 29, 2025.

* cited by examiner

TO ADJUSTABLE
PRESSURE
SOURCE  *201*

SUSPENSION DAMPER WITH REMOTELY-OPERABLE VALVE

CROSS-REFERENCE TO RELATED APPLICATIONS

This patent application is a continuation application of and claims the benefit of co-pending U.S. patent application Ser. No. 13/189,216, filed Jul. 22, 2011, entitled, "SUSPENSION DAMPER WITH REMOTELY-OPERABLE VALVE", by John Marking, assigned to the assignee of the present application, which is incorporated herein in its entirety by reference thereto.

The Ser. No. 13/189,216 application claims benefit of U.S. provisional patent application Ser. No. 61/366,871, filed Jul. 22, 2010, and U.S. provisional patent application Ser. No. 61/381,906, filed Sep. 10, 2010, each of which is herein incorporated by reference.

The Ser. No. 13/189,216 application is also a continuation-in-part of U.S. patent application Ser. No. 13/010,697, filed Jan. 20, 2011 and is now Issued U.S. Pat. No. 8,857,580, which claims benefit of U.S. provisional patent application Ser. No. 61/296,826, filed Jan. 20, 2010. U.S. patent application Ser. No. 13/010,697 is a continuation-in-part of U.S. patent application Ser. No. 12/684,072, filed Jan. 7, 2010, now abandoned, which claims benefit of U.S. provisional patent application No. 61/143,152, filed Jan. 7, 2009. Each of the aforementioned related patent applications is herein incorporated by reference.

The Ser. No. 13/189,216 application is also a continuation-in-part of co-pending U.S. patent application Ser. No. 12/684,072, filed Jan. 7, 2010, which claims benefit of U.S. provisional patent application No. 61/143,152, filed Jan. 7, 2009. The Ser. No. 13/189,216 application is also a continuation-in-part of U.S. patent application Ser. No. 13/175,244, filed Jul. 1, 2011 and now Issued U.S. Pat. No. 8,627,932, which claims benefit of U.S. provisional patent application No. 61/361,127, filed Jul. 2, 2010. Each of the aforementioned related patent applications is herein incorporated by reference.

BACKGROUND

1. Field of the Invention

Embodiments of the invention generally relate to a damper assembly for a vehicle. More specifically, certain embodiments relate to a remotely-operated valve used in conjunction with a vehicle damper.

Vehicle suspension systems typically include a spring component or components and a dampening component or components. Typically, mechanical springs, like helical springs, are used with some type of viscous fluid-based dampening mechanism and the two are mounted functionally in parallel. In some instances features of the damper or spring are user-adjustable. What is needed is an improved method and apparatus for adjusting dampening characteristics, including remote adjustment.

2. Summary of the Invention

The invention includes a vehicle damper comprising a cylinder and a piston; a working fluid within the cylinder; a reservoir in fluid communication with the working fluid to receive working fluid from the cylinder in a compression stroke; and a valve, the valve operable to permit and restrict flow of the working fluid between the cylinder and the reservoir. In another embodiment, a pressurizable portion of a reservoir adjacent a floating piston has an adjustable pressure.

BRIEF DESCRIPTION OF THE DRAWINGS

So that the manner in which the above recited features can be understood in detail, a more particular description may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
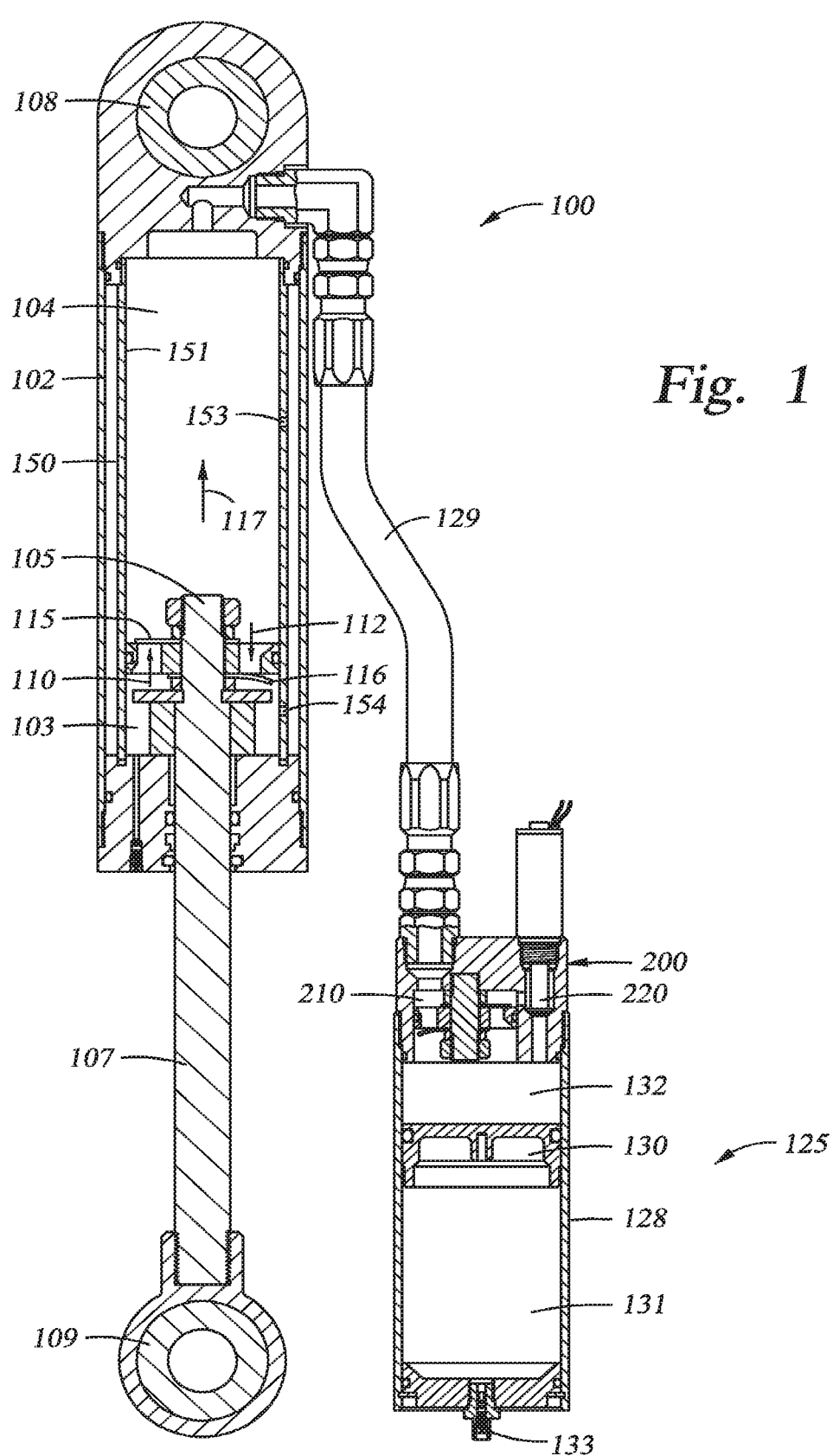
FIG. 1 is a section view showing a suspension damping unit with a reservoir.

As used herein, the terms "down," "up," "downward," "upward," "lower," "upper" and other directional references are relative and are used for reference only. FIG. 1 is a section view of a suspension damper 100. The damper 100 includes a cylinder portion 102 with a rod 107 and a piston 105. In one embodiment, fluid meters from one side of the piston 105 to the other side by passing through flow paths 110, 112 formed in the piston 105. In the embodiment shown, shims 115, 116 are used to partially obstruct flow paths 110, 112 through the piston 105 in two directions. By selecting shims having certain desired stiffness characteristics, the dampening effects caused by the piston 105 can be increased or decreased and dampening rates can be different between the compression and rebound strokes of the piston 105. For example, shims 115 are configured to meter rebound flow from the rebound portion 103 of the cylinder 102 to the compression portion 104 of the cylinder 102 (shown as arrow 110). Shims 116, on the other hand, are configured to meter compression flow from the compression portion 104 of the cylinder 102 to the rebound portion 103 (shown as arrow 112). In FIG. 1, the piston is moving in a compression stroke (as shown by directional arrow 117) with the rod 107 and piston 105 moving further into the compression portion 104 and causing fluid to flow from a compression to a rebound side of the cylinder portion 102 via flow path 112. Note that piston apertures (not shown) may be included in planes other than those shown (e.g. other than apertures used by paths 110 and 112) and further that such apertures may, or may not, be subject to the shims 115, 116 as shown (because for example, the shims 115, 116 may be clover-shaped or have some other non-circular shape). In one embodiment, the piston 105 is solid and all damping flow must traverse a flow bypass (e.g. annular space 150 between cylinder 102 and inner cylinder 151) and/or communicate with a reservoir.

In the embodiment of FIG. 1, the damper 100 includes an annular bypass formed between a wall of cylinder portion 102 and an inner wall 151 having a slightly smaller diameter that the cylinder wall. In this manner an annular space 150 is provided between the walls. In one embodiment, at least one port 153 on the compression side of the cylinder and another port 154 on the rebound side permit working fluid to pass between the compression and rebound sides without moving through the shimmed paths provided by the piston 105. The bypass feature is utilized so long as the piston is between the two ports in either the compression or rebound strokes.

The lower portion of the rod 107 is supplied with a bushing set 109 for connecting to a portion of a vehicle wheel suspension linkage. An upper portion of the cylinder 102 may be supplied with an eyelet 108 to be mounted to another portion of the vehicle, such as the frame, that moves independently of the first part. A spring member (not shown) is usually mounted to act between the same portions of the vehicle as the damper. As the rod 107 and piston 105 move into cylinder 102 (during compression), the damping fluid slows the movement of the two portions of the vehicle relative to each other due, at least in part, to the incompressible fluid moving through the shimmed paths provided in the piston 105 and/or through the metered bypass. As the rod 107 and piston 105 move out of the cylinder 102 (during extension or "rebound") fluid meters again through shimmed paths and the flow rate and corresponding rebound rate is controlled, at least in part, by the shims 115.

A reservoir 125 is in fluid communication with the damper cylinder 102 for receiving and supplying damping fluid as the piston rod 107 moves in and out of the cylinder 102, thereby variably displacing damping fluid. The reservoir 125 includes a cylinder portion 128 in fluid communication with the compression portion 104 of the damper cylinder 102 via fluid conduit 129 which houses a fluid path between the components. The reservoir 125 also includes a floating piston 130 with a volume of gas in a gas portion 131 on a backside ("blind end" side) of it, the gas being compressible as a fluid portion 132 of the reservoir cylinder 128 fills with damping fluid due to movement of the damper rod 107 into the damper cylinder 102. The pressure of gas in portion 131 can be adjusted with compressed air introduced through gas valve 133 located at a lower end of the reservoir cylinder 128. Certain features of reservoir-type dampers are shown and described in U.S. Pat. No. 7,374,028, which is incorporated herein, in its entirety, by reference. In one embodiment the damper includes an in-line reservoir (e.g. floating piston and gas charge) rather than a remote reservoir as shown in FIG. 1. The principles disclosed herein are equally applicable in either case.

In one embodiment, the damping characteristics of the damper 100 are altered by at least one valve that regulates flow between the compression chamber 104 and the fluid portion 132 of the reservoir 125. In the particular embodiment shown in FIG. 1, a reservoir valve assembly 200 includes two valves 210, 220, each of which permits or prevents fluid flow into the reservoir fluid portion 132. The valves 210, 220 are shown in more detail in FIGS. 2A, B and 3A, B. FIGS. 2A and 2B are section views of the reservoir 125 showing valves of the valve assembly 200 in various positions during a compression stroke of the damper 100. FIGS. 3A and 3B are section views of the reservoir 125 showing valves of the valve assembly 200 in various positions during a rebound stroke of the damper 100.

As shown in the Figures, the reservoir valve assembly 200 is threadedly attached at an upper end of the cylinder portion 128 of the reservoir 125 and serves to seal the fluid portion 132. Valve 210 includes a pathway leading into the fluid portion 132 of the reservoir, the pathway including shims 212 functionally like those (115, 116) used in damper piston 105 and designed to offer predetermined resistance to fluid flow passing into the reservoir 125. Another set of shims 213 meter the flow of fluid out of the fluid portion 132 of the reservoir 125 during a rebound stroke of the damper (FIGS. 3A, B). The flow of fluid into and through valve 210 in a compression stroke is shown by arrow 211. As shown, the flow of fluid has un-seated shims 212 to permit the flow of fluid into the fluid portion 132.

Another valve in the valve assembly 200 is a remotely-operable valve 220 and includes a movable plunger 222 that is seatable on a seat 225. In FIG. 2A the valve 220 is open with a fluid path therethrough shown by arrow 221. While the Figure shows both valves open and fluid flow traveling through both, it will be understood that depending upon the design of the system, including the selection of shims, valve 210 might remain closed and fluid might flow only through open valve 220 (or vice versa). In FIG. 2B remotely-operable valve 220 is shown in a closed position with the plunger 222 seated upon seat 225. In the embodiment shown, the valve 220 is shifted between an open and closed position by a solenoid 223 located above the valve and capable of receiving an electrical signal and causing the mechanical movement of the plunger 222. In one embodiment, the solenoid 223 operates in a manner that partially closes or partially opens the valve 220, therefore permitting or restricting flow without completely opening or closing the valve (e.g. as in an infinitely variable throttle operating between absolute open and absolute closed positions).

In one embodiment, the solenoid-operated valve 220 is normally open (as shown in FIG. 2A) with working or damping fluid permitted to flow through both valves 210, 220 of reservoir valve assembly 200. In the early portion of the compression stroke, additional fluid may also bypass the shims of piston 105 due to the annular bypass 150 with its ports 153, 154 (FIG. 1). The foregoing configuration describes a "compliant" damping mode with reduced dampening which is suitable for "plush" shock absorption but which may also allow a so-equipped vehicle to pitch or roll during braking or cornering respectively. As such, compliant damping is sometimes preferable but there are times when a more rigid damping mode is appropriate. In one embodiment, the normally-open solenoid valve 220 may be, at the user's discretion, partially or completely closed as it appears in FIG. 2B, to increase a damping rate of the damper 100.

In some instances, it may be desirable to increase the damping rate when moving a vehicle from off-road to on highway use. Off-road use often requires a high degree of compliance to absorb shocks imparted by the widely varying terrain. On highway use, particularly with long wheel travel vehicles, often requires more rigid shock absorption to allow a user to maintain control of a vehicle at higher speeds. This may be especially true during cornering or braking.

In other instances, it is desirable to control/change dampening characteristics in a rebound stroke of a damper. FIGS. 3A and B show the operation of the damper 100 with working fluid traveling through the valves 210, 220 of the assembly 200 in a rebound stroke. In FIG. 3A, both valves are open to the flow of return fluid. As shown, a fluid path 216 is created through shims 213 of valve 210 and another path 217 through the solenoid-operated valve 220 which is shown in an open position, thereby reducing dampening effects and essentially permitting the shock absorber to retract faster than would otherwise be possible. Such a setting is important in an instance where terrain is encountered that results in a sudden "drop" of the ground away from a wheel or wheels of the vehicle. FIG. 3B illustrates the same damper reservoir in a rebound stroke with the remotely-operable valve 220 in a closed position, thereby adding additional dampening to the rebounding piston 105.

One embodiment comprises a four wheeled vehicle having solenoid valve-equipped shock absorbers at each (of four) wheel. The solenoid valve 220 (which may be mechanically, pneumatically, or hydraulically operated instead of solenoid operated) of each of the front shock absorbers may be electrically connected with a linear, motion activated switch (such as that which operates an automotive brake light) that is activated in conjunction with the vehicle brake pedal. When the brake pedal is depressed beyond a certain distance, corresponding usually to harder braking and hence potential for vehicle nose dive, the electric switch connects a power supply to the normally open solenoid in each of the front shocks, thereby closing the valve in those shocks. As such, the front shocks become more rigid during hard braking. Other mechanisms may be used to trigger the shocks such as accelerometers (e.g., tri-axial) for sensing pitch and roll of the vehicle and activating, via a microprocessor, the appropriate solenoid valves for optimum vehicle control.

In one embodiment, a vehicle steering column includes right turn and left turn limit switches such that a hard turn in either direction activates (e.g. closes valve 220) the solenoid on the shocks opposite that direction (for example a hard right turn would cause more rigid shocks on the vehicle left side). Again, accelerometers in conjunction with a microprocessor and a switched power supply may perform the solenoid activation function by sensing the actual g-force associated with the turn (or braking; or throttle acceleration for the rear shock activation) and triggering the appropriate solenoid(s) at a preset threshold g-force.

In one embodiment, a pressure intensifier damper arrangement may be located within the fluid path of the remotely-operable valves 220 such that the solenoid valve controls flow through that auxiliary damper which is then additive with the valve assembly 200. In one embodiment the valve assembly 200 comprises a pressure intensifier (such as described in U.S. Pat. No. 7,374,028, which is incorporated, entirely, herein by reference). In one embodiment one or both of the valves 210, 220 comprise standard shim-type dampers. In one embodiment one or both of the valves 210, 220 include an adjustable needle for low speed bleed. In one embodiment a blow off (e.g. checking poppet-type or shim) is included in one of the flow paths associated with the valves 210, 220.

Figure 4:
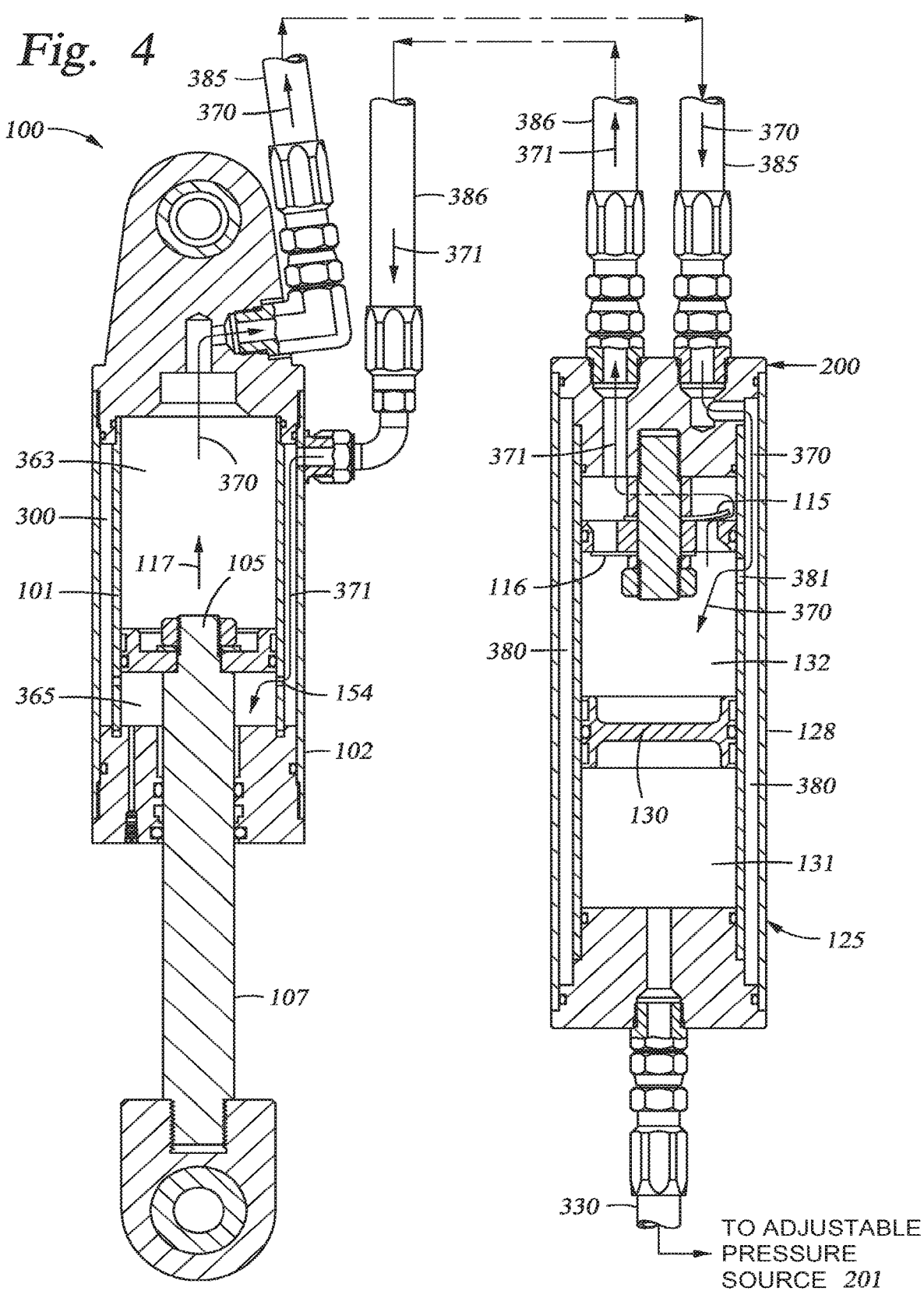
FIG. 4 is a section view of a damper in a compression stroke.

Other embodiments are illustrated in FIGS. 4-7. For convenience, similar components are labeled with the same numbers as components in previous embodiments. FIG. 4 is a section view of a damper 100 in a compression stroke. Damping fluid is moved between compression chamber 363 and rebound chamber 365 via compression line 385, reservoir 125, and rebound line 386. The damper 100 includes a main cylinder 102 having a piston 105 and shaft 107. In the case of the embodiment of FIG. 4, the piston is solid and fluid is moved in each direction in both the compression and rebound strokes of the damper. In another embodiment, the piston could include shims to meter fluid between the compression 363 and rebound 365 sides of the cylinder 102. Movement of the piston 105 into the compression portion 363 is shown by directional arrow 117. The cylinder also includes a bypass structure formed by an annular area 300 between the outer wall 102 of the cylinder and an inner wall 101. A port 154 leading from the annular area 300 to the rebound portion 365 of the chamber permits fluid flow into the rebound portion from the reservoir as will be explained. In one embodiment, the reservoir 125 is equipped with a cylinder portion 128 housing a fluid portion 132 and a presurizable portion 131 separated by a floating piston 130. A valve assembly 220 enclosed in the reservoir housing operates to meter fluid into and out of the reservoir 125.

Still considering FIG. 4, damping fluid is moved by solid piston 105 out of compression chamber 363 along the compression feed flow path 370 and into fluid portion 132 of reservoir 125 via compression line 385, an annulus 380 and a port 381. Simultaneously, the pressure in rebound chamber 365 decreases as solid piston 105 moves in compression. Damping fluid is correspondingly forced through the shims 115 of the valve assembly 200 and along the compression return flow path 371 to the rebound portion 365 (which includes travel through rebound line 386, internal annulus 300, and port 154).

As the compression stroke progresses, the volume of the shaft 107 incurring into the rebound/compression chamber 365/363 is accommodated by movement of floating piston 130 in the reservoir 125 and associated compression of pressurizable portion 131. As pressure in portion 131 increases, so does damping force of the shock absorber as increased pressure is communicated to the damping fluid by movement of the floating piston 130 (the damping fluid increases in pressure and affects change in the pressure of, in one embodiment, a gas in portion 131). Increased damping fluid pressure acts against the piston area of the solid piston 105, thereby increasing the force on the shock absorber necessary cause compression of the shock absorber. In other words the shock absorber increasingly resists compression as it is compressed.

Figure 5:
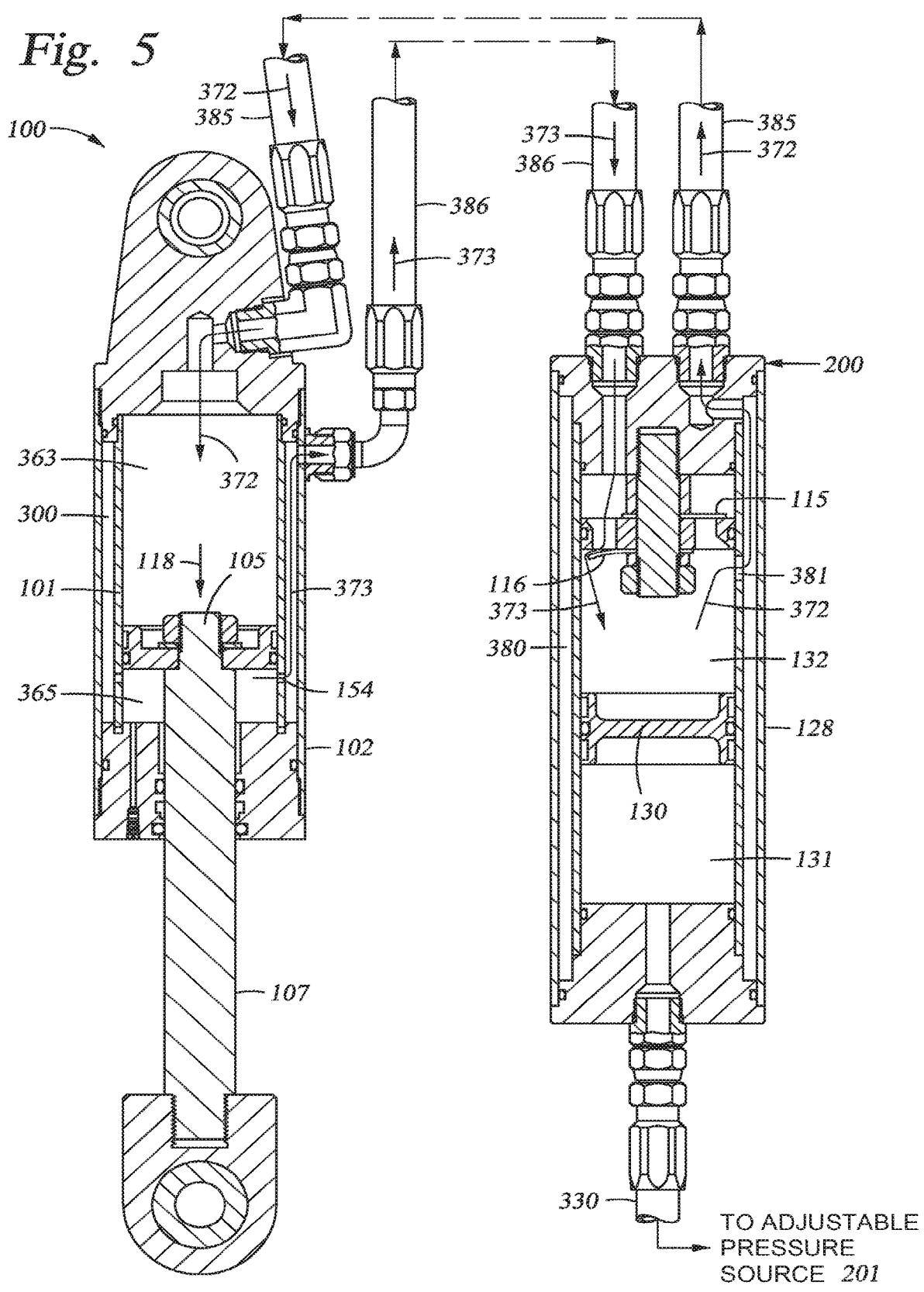
FIG. 5 is a section view of the damper of FIG. 4 in a rebound stroke.

Referring to FIG. 5, an illustration of a rebound stroke, the shaft 107 is moving out of the chambers 365, 363 as shown by directional arrow 118. As illustrated, fluid flow directions are generally reversed from those shown in the compression stroke of FIG. 4. In particular, fluid exits the reservoir 125 along a path 372 that utilizes annular space 380 and port 381. The exiting fluid 372 returns to the main dampening cylinder 102 via annular area 300 and port 154 that leads to the rebound side 365 of the chamber. Rebound fluid enters the reservoir 125 via path 373 and passes through shims 116 in valve assembly 200 where it is metered.

In one embodiment, portion 131 of the chamber 128 comprises a compressible fluid such as a gas. In one embodiment an initial static pressure of the gas is set between 150 and 250 psi. The pressurizable portion 131 is in fluid communication with a connection member 330 and an adjustable pressure source (not shown but noted by "201"). The resistance of the shock absorber's increasing compression can be altered as desired by adjusting the pressure using the adjustable pressure source 201. If the source pressure is decreased, the shock absorber will be relatively easier to compress and if the source pressure is increased, the shock absorber will be more resistant to compression.

The source pressure can be increased for example, when a shock absorber-equipped vehicle is operated on relatively smooth surface such as a paved road and stiffness is more useful for good handling than compliance. Conversely, if a so-equipped vehicle is operated off-road, compliant travel may be more desirable and the source pressure would be correspondingly decreased. It is noteworthy that absent any adjustment of the source pressure, the increasing resistance of the damper based on compression of portion 131 is dependent primarily on the position of the shock in its travel (e.g. position dependent characteristic). As stated, the position/rigidity function associated with portion 131 and the damping fluid pressure can be selectively altered and tailored by adjusting a pressure of the adjustable pressure source 201.

In one embodiment, the source pressure is adjustable by an operator of a vehicle. For example, an on board source of compressed air can be used to add pressurized gas to portion 131 in varying amounts either by a switch in the vehicle compartment or as will be explained, in an automated fashion based upon vehicle or terrain conditions. Similarly, pressure can be removed from portion 131 as needed.

Figure 2:
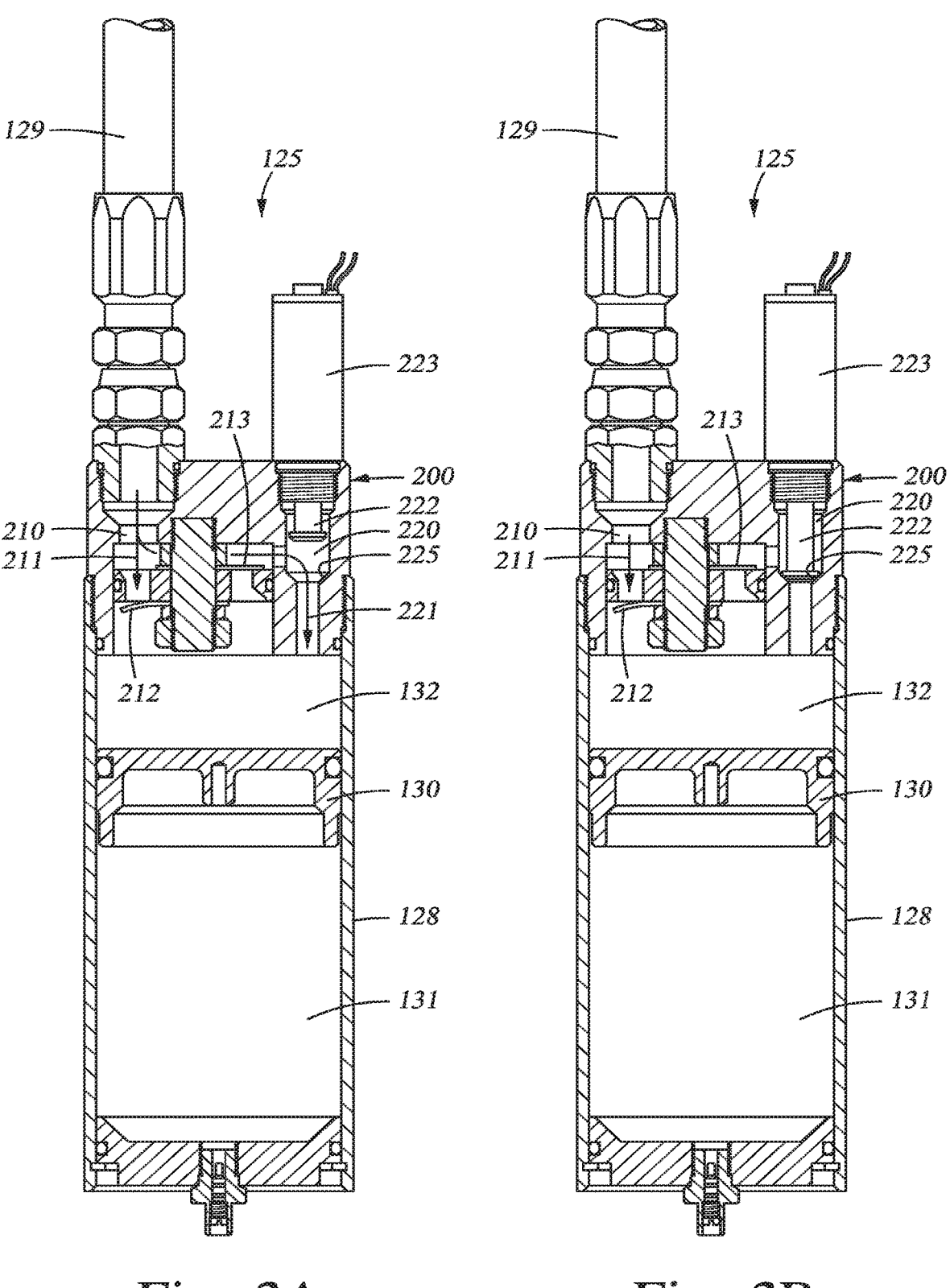
FIGS. 2A and 2B are section views of the reservoir showing valves of a valve assembly in various positions during a compression stroke of the damper.
Figure 3:
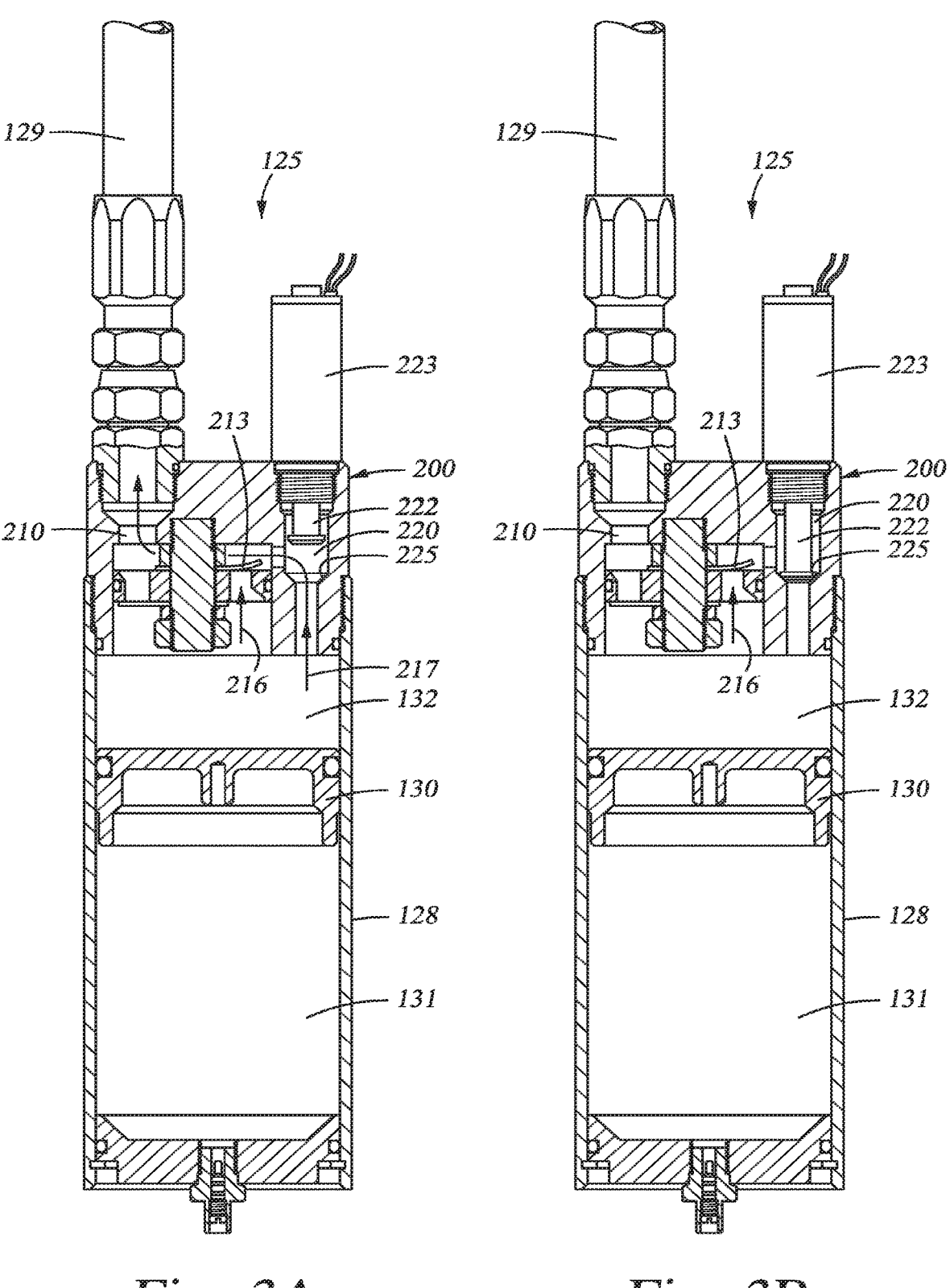
FIGS. 3A and 3B are section views of the reservoir showing valves of a valve assembly in various positions during a rebound stroke of the damper.
Figure 6:
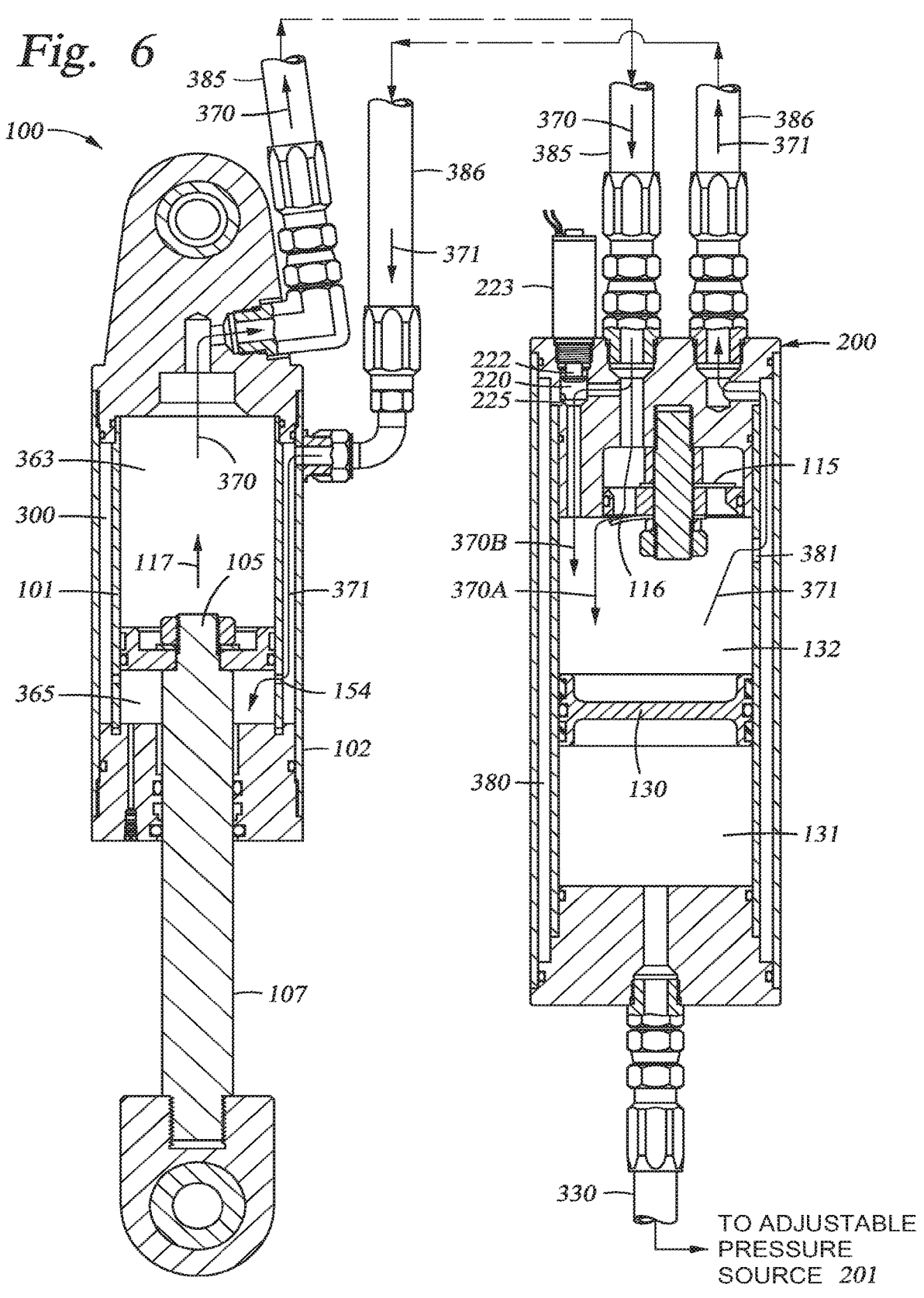
FIG. 6 is a section view of a damper in a compression stroke.
Figure 7:
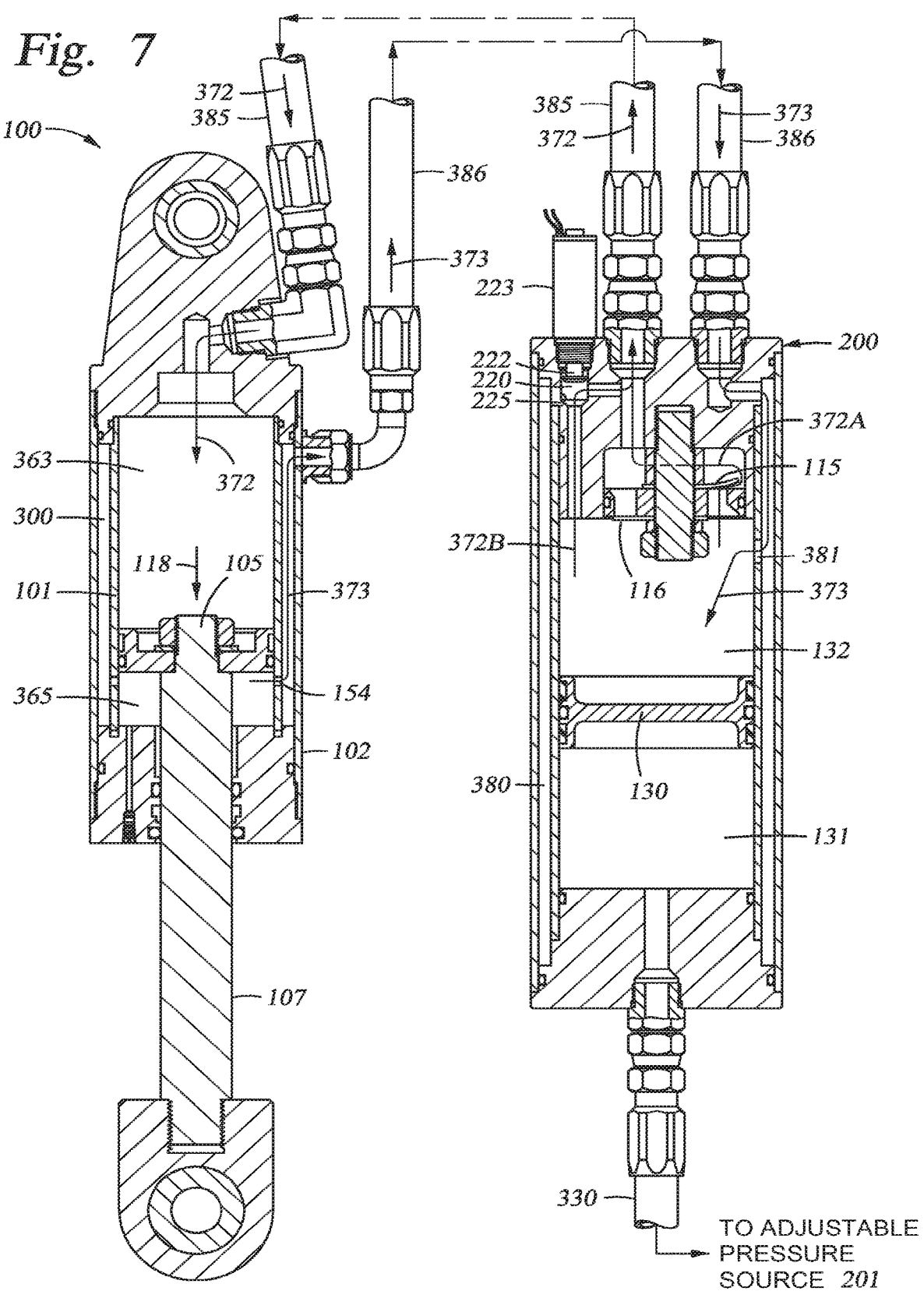
FIG. 7 is a section view of the damper of FIG. 6 in a rebound stroke.

FIGS. 6 and 7 illustrate a shock absorber that is similar to the shock absorber of FIGS. 4 and 5 in some respects and similar to the embodiments of FIGS. 1 through 3 in other respects. In the embodiment of FIGS. 6 and 7, however, the valve assembly 200 includes a remotely-operable valve 220 in addition to shims 115, 116 in order to permit additional and more responsive dampening control. For example, in FIG. 6 the compression flow 370 travels out of chamber 363 through line 385 and into reservoir 125. Upon entering reservoir 125, the compression flow path 370 is divided into two separate paths 370A, 370B, either or both of which can be used to control dampening. Path 370A travels through shims 116, like the shims of the other embodiments. Path 370B however, travels through a remotely-operable valve 220 consisting of a plunger 222 and seat 225. Valve 220 is shown in an open position permitting fluid flow therethrough and in doing so, providing a bypass around the dampening effects of the shims 116. Return fluid travels along a path 371 from fluid portion 132 through port 381, annular area 380 and on to the rebound portion 365 of main dampening chamber 102, via return line 386.

FIG. 7 illustrates the operation of the damper of FIG. 6 in a rebound stroke. As piston 105 retracts (in direction shown by arrow 118), fluid from the rebound portion 365 of the main cylinder 102 utilizes port 154 and annular area 300 to exit cylinder along a path 373. As the rebound fluid enters the reservoir, it utilizes annular area 380 and port 381 to enter fluid portion 132. From portion 132, the exiting fluid flow is divided into two paths 372A and 372B. Path 372A takes the fluid through shims 115 and path 372 B takes part of the fluid through remotely-operable valve 220. As in the case of the compression stroke, the remotely-operable valve 220, in its open position as shown, reduces rebound dampening by providing a bypass around shims 115. While valve 220 is shown in FIGS. 6 and 7 in a fully open position, it will be understood that the valve could be closed or could assume any number of partially-open positions depending upon the requirements of a vehicle and/or terrain and an operator's needs. In one embodiment, the valve assembly 200 is configured with a boost type position sensitive valve as shown and described in U.S. patent application Ser. No. 12/509,258 which is entirely incorporated herein by reference. In one embodiment the damping shims of the damping piston are selectively adjustable. In one embodiment the shims of the damping piston are fixed.

As in other embodiments, the remotely-operable valve 220 may be solenoid operated (as illustrated in FIGS. 6 and 7 with solenoid 223) or hydraulically operated or pneumatically operated or operated by any other suitable motive mechanism. The valve may be operated remotely by a switch or potentiometer located in the cockpit of a vehicle or attached to appropriate operational parts of a vehicle for timely activation (e.g. brake pedal) or may be operated in response to input from a microprocessor (e.g. calculating desired settings based on vehicle acceleration sensor data) or any suitable combination of activation means. In like manner, a controller for the adjustable pressure source (or for both the source and the valve) may be cockpit mounted and may be manually adjustable or microprocessor controlled or both or selectively either.

It may be desirable to increase the damping rate when moving a vehicle from off-road to on highway use. Off-road use often requires a high degree of compliance to absorb shocks imparted by the widely varying terrain. On highway use, particularly with long wheel travel vehicles, often requires more rigid shock absorption to allow a user to maintain control of a vehicle at higher speeds. This may be especially true during cornering or braking One embodiment comprises a four wheeled vehicle having solenoid valve equipped shock absorbers at each (of four) wheel. The solenoid valve (which in one embodiment is cable operated instead of solenoid operated) of each of the front shock absorbers may be electrically connected with a linear switch (such as that which operates an automotive brake light) that is activated in conjunction with the vehicle brake pedal. When the brake pedal is depressed beyond a certain distance, corresponding usually to harder braking and hence potential for vehicle nose dive, the electric switch connects a power supply to the normally open solenoid in each of the front shocks thereby closing the paths 8SA in those shocks. As such the front shocks become more rigid during hard braking. Other mechanisms may be used to trigger the shocks such as accelerometers (e.g. tri-axial) for sensing pitch and roll of the vehicle and activating, via a microprocessor, the appropriate solenoid valves for optimum vehicle control.

In one embodiment, a vehicle steering column includes right turn and left turn limit switches such that a hard turn in either direction activates (e.g. closes path 8SA) the solenoid on the shocks opposite that direction (for example a hard right turn would cause more rigid shocks on the vehicle left side). Again, accelerometers in conjunction with a microprocessor and a switched power supply may perform the solenoid activation function by sensing the actual g-force associated with the turn (or braking; or throttle acceleration for the rear shock activation) and triggering the appropriate solenoid(s) at a preset threshold g-force.

In one embodiment, a pressure intensifier damper arrangement may be located within the fluid path such that the solenoid-controlled valve controls flow through that auxiliary damper which is then additive with the damper mechanism of the damping piston. In one embodiment the damper mechanism of the damping piston comprises a pressure intensifier. In one embodiment one or both of the dampers comprise standard shim type dampers. In one embodiment one or both of the dampers include an adjustable needle for low speed bleed. In one embodiment a blow off (e.g. checking poppet type or shim) is included in one of the flow paths or in a third parallel flow path.

Figure 8:
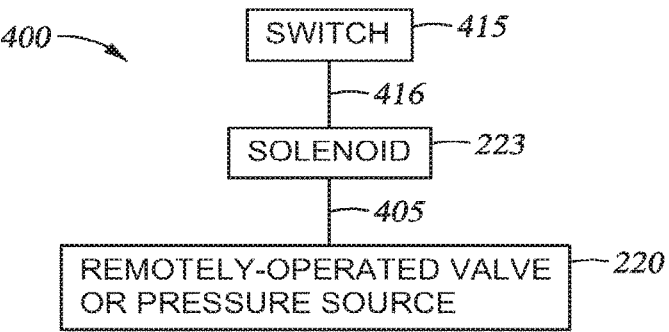
FIG. 8 is a schematic diagram showing a control arrangement for a remotely-operated valve.

FIG. 8 is a schematic diagram showing a control arrangement 400 for a remotely-operated valve, like valve 220 described herein or in one embodiment, the pressure source 201. As illustrated, a signal line 416 runs from a switch 415 to a solenoid 223 along an electrically conductive line 416. Thereafter, the solenoid 223 converts electrical energy into mechanical movement (identified by item 405) and shifts a plunger of the valve 220, thereby opening or closing the valve or causing the plunger to assume some predetermined position in-between. While FIG. 8 is simplified and involves control of a single bypass valve 220, it will be understood that any number of valves could be operated simultaneously or separately depending upon needs in a vehicular suspension system. Additional switches could permit individual operation of separate remotely-operable valves 220.

As discussed, a remotely-operable valve 220 or a remotely operated pressure source 201 like the one described above is particularly useful with an on-/off-road vehicle. These vehicles can have as more than 20″ of shock absorber travel to permit them to negotiate rough, uneven terrain at speed with usable shock absorbing function. In off-road applications, compliant dampening is necessary as the vehicle relies on its long travel suspension when encountering often large off-road obstacles. Operating a vehicle with very compliant, long travel suspension on a smooth road at higher speeds can be problematic due to the springiness/sponginess of the suspension and corresponding vehicle handling problems associated with that (e.g. turning roll, braking pitch). Such compliance can cause reduced handling characteristics and even loss of control. Such control issues can be pronounced when cornering at high speed as a compliant, long travel vehicle may tend to roll excessively. Similarly, such a vehicle may pitch and yaw excessively during braking and acceleration. With the remotely-operated bypass dampening and "lock out" described herein, dampening characteristics of a shock absorber can be completely changed from a compliantly dampened "springy" arrangement to a highly dampened and "stiffer" (or fully locked out) system ideal for higher speeds on a smooth road. In one embodiment, where compression flow through the piston 105 is completely blocked, closure of the valve 220 can result in substantial "lock out" of the suspension (the suspension is rendered essentially rigid except for the movement of fluid through shimmed valve 210). In one embodiment, where some compression flow is allowed through the piston 105 or the annular bypass 150, closure of the valve 220 results in a stiffer but still functional compression damper.

Figure 9:
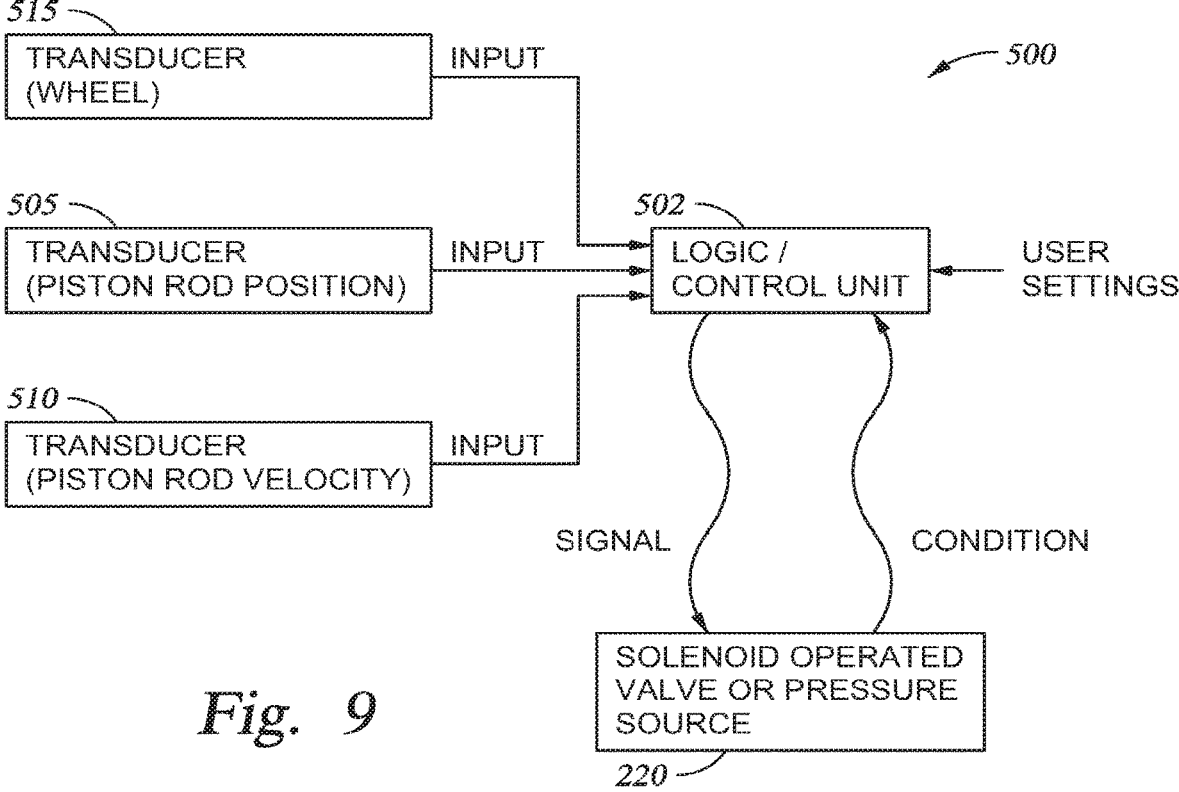
FIG. 9 is a schematic diagram showing another control arrangement for a remotely-operated valve.

In addition to, or in lieu of, the simple, switch operated remote arrangement of FIG. 8, the remotely-operable valve 220 can be operated automatically based upon one or more driving conditions. FIG. 9 shows a schematic diagram of a remote control system 500 based upon any or all of vehicle speed, damper rod speed, and damper rod position. One embodiment of the arrangement of FIG. 9 is designed to automatically increase dampening in a shock absorber in the event a damper rod reaches a certain velocity in its travel towards the bottom end of a damper at a predetermined speed of the vehicle. In one embodiment, the system 500 adds dampening (and control) in the event of rapid operation (e.g. high rod velocity) of the damper to avoid a bottoming out of the damper rod as well as a loss of control that can accompany rapid compression of a shock absorber with a relative long amount of travel. In one embodiment, the system 500 adds dampening (e.g. closes or throttles down the bypass) in the event that the rod velocity in compression is relatively low but the rod progresses past a certain point in the travel. Such configuration aids in stabilizing the vehicle against excessive low-rate suspension movement events such as cornering roll, braking and acceleration yaw and pitch and "g-out."

FIG. 9 illustrates, for example, a system 500 including three variables: rod speed, rod position and vehicle speed. Any or all of the variables shown may be considered by logic unit 502 in controlling the solenoids of valves 220 or control of a remotely operated pressure source. Any other suitable vehicle operation variable may be used in addition to or in lieu of the variables 515, 505, 510 such as, for example, piston rod compression strain, eyelet strain, vehicle mounted accelerometer (or tilt/inclinometer) data or any other suitable vehicle or component performance data. In one embodiment, piston 105's position within cylinder 102 is determined using an accelerometer to sense modal resonance of cylinder 102. Such resonance will change depending on the position of the piston 105 and an on-board processor (computer) is calibrated to correlate resonance with axial position. In one embodiment, a suitable proximity sensor or linear coil transducer or other electro-magnetic transducer is incorporated in the dampening cylinder 102 to provide a sensor to monitor the position and/or speed of the piston 105 (and suitable magnetic tag) with respect to the cylinder 102. In one embodiment, the magnetic transducer includes a waveguide and a magnet, such as a doughnut (toroidal) magnet that is joined to the cylinder and oriented such that the magnetic field generated by the magnet passes through the piston rod 107 and the waveguide. Electric pulses are applied to the waveguide from a pulse generator that provides a stream of electric pulses, each of which is also provided to a signal processing circuit for timing purposes. When the electric pulse is applied to the waveguide, a magnetic field is formed surrounding the waveguide. Interaction of this field with the magnetic field from the magnet causes a torsional strain wave pulse to be launched in the waveguide in both directions away from the magnet. A coil assembly and sensing tape is joined to the waveguide. The strain wave causes a dynamic effect in the permeability of the sensing tape which is biased with a permanent magnetic field by the magnet. The dynamic effect in the magnetic field of the coil assembly due to the strain wave pulse, results in an output signal from the coil assembly that is provided to the signal processing circuit along signal lines. By comparing the time of application of a particular electric pulse and a time of return of a sonic torsional strain wave pulse back along the waveguide, the signal processing circuit can calculate a distance of the magnet from the coil assembly or the relative velocity between the waveguide and the magnet. The signal processing circuit provides an output signal, either digital or analog, proportional to the calculated distance and/or velocity. A transducer-operated arrangement for measuring rod speed and velocity is described in U.S. Pat. No. 5,952,823 and that patent is incorporated by reference herein in its entirety.

While a transducer assembly located at the damper measures rod speed and location, a separate wheel speed transducer for sensing the rotational speed of a wheel about an axle includes housing fixed to the axle and containing therein, for example, two permanent magnets. In one embodiment, the magnets are arranged such that an elongated pole piece commonly abuts first surfaces of each of the magnets, such surfaces being of like polarity. Two inductive coils having flux-conductive cores axially passing therethrough abut each of the magnets on second surfaces thereof, the second surfaces of the magnets again being of like polarity with respect to each other and of opposite polarity with respect to the first surfaces. Wheel speed transducers are described in U.S. Pat. No. 3,986,118 which is incorporated herein by reference in its entirety.

In one embodiment, as illustrated in FIG. 9, the logic unit 502 with user-definable settings receives inputs from the rod speed 510 and location 505 transducers as well as the wheel speed transducer 515. The logic unit 502 is user-programmable and depending on the needs of the operator, the unit records the variables and then if certain criteria are met, the logic circuit sends its own signal to the bypass to either close or open (or optionally throttle) the remotely-operable valve 220. Thereafter, the condition of the bypass valve is relayed back to the logic unit 502.

In one embodiment, the logic shown in FIG. 9 assumes a single damper but the logic circuit is usable with any number of dampers or groups of dampers. For instance, the dampers on one side of the vehicle can be acted upon while the vehicles other dampers remain unaffected.

While the examples illustrated relate to manual operation and automated operation based upon specific parameters, the remotely-operated valve 220 (with or without valve 210 in valve assembly 200) or the remote operation of pressure source 201 can be used in a variety of ways with many different driving and road variables. In one example, the valve 220 is controlled based upon vehicle speed in conjunction with the angular location of the vehicle's steering wheel. In this manner, by sensing the steering wheel turn severity (angle of rotation), additional dampening can be applied to one damper or one set of dampers on one side of the vehicle (suitable for example to mitigate cornering roll) in the event of a sharp turn at a relatively high speed. In another example, a transducer, such as an accelerometer, measures other aspects of the vehicle's suspension system, like axle force and/or moments applied to various parts of the vehicle, like steering tie rods, and directs change to the bypass valve positioning in response thereto. In another example, the bypass can be controlled at least in part by a pressure transducer measuring pressure in a vehicle tire and adding dampening characteristics to some or all of the wheels in the event of, for example, an increased or decreased pressure reading. In one embodiment, the damper bypass or bypasses are controlled in response to braking pressure (as measured, for example, by a brake pedal sensor or brake fluid pressure sensor or accelerometer). In still another example, a parameter might include a gyroscopic mechanism that monitors vehicle trajectory and identifies a "spin-out" or other loss of control condition and adds and/or reduces dampening to some or all of the vehicle's dampers in the event of a loss of control to help the operator of the vehicle to regain control.

While the foregoing is directed to embodiments of the invention, other and further embodiments of the invention may be devised without departing from the basic scope thereof, and the scope thereof is determined by the claims that follow.

What I claim is:

1. A vehicle damper comprising:

a cylinder and a piston disposed within said cylinder, said piston coupled to a rod, said piston separating a compression portion of said cylinder from a rebound portion of said cylinder, said piston disposed within said cylinder further including a passageway therethrough, said passageway limiting a flow rate of said working fluid through said piston disposed within said cylinder in at least one direction;

a working fluid within the cylinder;

a reservoir in fluid communication with the working fluid, the reservoir operable to receive working fluid from the cylinder in a compression stroke, said reservoir further comprising:

a floating piston disposed within said reservoir;

a volume of gas, said gas being compressible as said reservoir receives said working fluid due to movement of a damper rod into said cylinder;

a fluid portion of said reservoir, said floating piston movably separating said fluid portion of said reservoir from said volume of gas;

a reservoir valve assembly, including:

a remotely-operable valve, wherein said reservoir valve assembly has a first position, in which said remotely-operable valve is open, and wherein said reservoir valve assembly has a second position, in which said remotely-operable valve is closed;

a first fluid path extending between said cylinder and a first shim, said first shim configured to block fluid flow from said fluid portion of said reservoir into said first fluid path, said first shim further configured to restrict fluid flow from said first fluid path into said fluid portion of said reservoir;

a second fluid path, said second fluid path having a first portion extending between said first fluid path and said remotely-operable valve, said second fluid path having a second portion extending between said remotely-operable valve and said fluid portion of said reservoir, wherein said first portion of said second fluid path and said second portion of said second fluid path are in fluid communication when said remotely-operable valve is open, and wherein said first portion of said second fluid path and said second portion of said second fluid path are not in fluid communication when said remotely-operable valve is closed;

a third fluid path, said third fluid path extending between said fluid portion of said reservoir and a second shim, said second shim configured to block fluid flow from said first portion of said second fluid path into said fluid portion of said reservoir, said second shim further configured to restrict fluid flow from said fluid portion of said reservoir into said first portion of said second fluid path;

wherein during a compression stroke of said vehicle damper, and when said remotely-operable valve is open, said reservoir valve assembly permits said working fluid to flow from said cylinder to said fluid portion of said reservoir by permitting said working fluid to flow from said cylinder and said first fluid path, past said first shim, and into said fluid portion of said reservoir while simultaneously permitting said working fluid to flow along said first portion of said second fluid path, said second portion of said second fluid path and into said fluid portion of said reservoir;

wherein during said compression stroke of said vehicle damper, and when said remotely-operable valve is closed, said reservoir valve assembly permits said working fluid to flow from said cylinder to said fluid portion of said reservoir by permitting said working fluid to flow from said cylinder said along said first fluid path, past said first shim, and into said fluid portion of said reservoir while preventing said working fluid from flowing along said second portion of said second fluid path thereby preventing said working fluid from flowing into said fluid portion of said reservoir along said second portion of said second fluid path;

wherein during a rebound stroke of said vehicle damper, and when said remotely-operable valve is open, said reservoir valve assembly permits said working fluid to flow from said fluid portion of said reservoir to said cylinder by permitting said working fluid to flow along said third fluid path, past said second shim, into said first portion of said second fluid path, into said first fluid path, and to said cylinder, while simultaneously permitting said working fluid to flow from said fluid portion of said reservoir along said second portion of said second fluid path, along said first portion of said second fluid path, into said first fluid path and into said cylinder;

wherein during said rebound stroke of said vehicle damper, and when said remotely-operable valve is closed, said reservoir valve assembly permits said working fluid to flow from said fluid portion of said reservoir to said cylinder by permitting said working fluid to flow along said third fluid path, past said second shim, into said first portion of said second fluid path, into said first fluid path, and to said cylinder, while simultaneously preventing said working fluid from flowing from said fluid portion of said reservoir into said first portion of said second fluid path; and said reservoir valve assembly of said vehicle damper enabling a user of said vehicle damper to control/change a rebound dampening rate for said vehicle damper during use of said vehicle damper, and wherein said rebound dampening rate can be selected to be different than a user selected compression dampening rate of said vehicle damper, and wherein said first fluid path, said first portion of said second fluid path, said second portion of said second fluid path, and said third fluid path each comprise a portion of a potential fluid path between said cylinder and said fluid portion of said reservoir; and a bypass, wherein at least some of said working fluid is permitted to travel between said compression portion of said cylinder and said rebound portion of said cylinder without travelling through said piston disposed within said cylinder during either said compression stroke or said rebound stroke.

2. The vehicle damper of claim 1, wherein the remotely-operable valve is controlled from a location of an operator in a vehicle.

3. The vehicle damper of claim 1, wherein control of the remotely-operable valve is by a manually operable switch having at least two positions.

4. The vehicle damper of claim 3, wherein the manually operable switch is located in a passenger compartment of a vehicle.

5. The vehicle damper of claim 1, wherein control of the remotely-operable valve is by an electrically operated solenoid actuated by a manually operable switch.

6. The vehicle damper of claim 1, wherein control of the remotely-operable valve is hydraulic.

7. The vehicle damper of claim 1, wherein control of the remotely-operable valve is pneumatic.

8. The vehicle damper of claim 1, wherein the remotely-operable valve is operated automatically based upon one of a terrain or vehicle operation variable.

9. The vehicle damper of claim 1, further including a load transducer for sensing a piston rod force created by a damper piston rod.

10. The vehicle damper of claim 1, further comprising a transducer arranged to measure an angle associated with a steering wheel of a vehicle.

11. The vehicle damper of claim 1, wherein the remotely-operable valve is operated automatically based upon one or more driving conditions.

12. The vehicle damper of claim 1, wherein the remotely-operable valve is operated automatically based upon vehicle performance data.

13. The vehicle damper of claim 1, wherein the remotely-operable valve is operated automatically based upon component performance data.

* * * * *